US011797359B2

(12) United States Patent
Xu

(10) Patent No.: US 11,797,359 B2
(45) Date of Patent: Oct. 24, 2023

(54) REPORT APPLICATION PROGRAMMING INTERFACE (API) CAPABILITY CHANGE BASED ON API FILTER

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/772,183

(22) PCT Filed: Oct. 28, 2020

(86) PCT No.: PCT/EP2020/080232
§ 371 (c)(1),
(2) Date: Apr. 27, 2022

(87) PCT Pub. No.: WO2021/083930
PCT Pub. Date: May 6, 2021

(65) Prior Publication Data
US 2022/0405153 A1 Dec. 22, 2022

(30) Foreign Application Priority Data
Oct. 31, 2019 (WO) ................ PCT/CN2019/114816

(51) Int. Cl.
G06F 3/00 (2006.01)
G06F 9/54 (2006.01)
(Continued)

(52) U.S. Cl.
CPC .............. G06F 9/541 (2013.01); G06F 9/542 (2013.01); H04W 24/02 (2013.01); H04W 24/10 (2013.01)

(58) Field of Classification Search
CPC ........................................................ G06F 9/54
(Continued)

(56) References Cited

U.S. PATENT DOCUMENTS 8,327,187 B1* 12/2012 Metcalf ................. H04L 49/109
714/10
2003/0074286 A1* 4/2003 Rodrigo ................ H04M 15/57
705/32

(Continued)

FOREIGN PATENT DOCUMENTS

JP 2021518085 A 7/2021
WO 2019196602 A1 10/2019

OTHER PUBLICATIONS

Shang Lei, Research and Design for Stateful Firewall on Multi-core Network Processors . (Year: 2009).*

(Continued)

Primary Examiner — Lechi Truong
(74) Attorney, Agent, or Firm — Withrow & Terranova, PLLC

(57) ABSTRACT

Systems and methods for reporting API capability change according to an API filter are provided. According to one aspect, a method for reporting API capability change according to an API filter comprises receiving a request to be notified of an API capability change related to an identified wireless device, the request identifying a set of one or more APIs to be monitored; receiving a notification that the identified wireless device has changed from a first type of core network to a second type of core network; determining an API capability change from the first type of core network to the second type of core network for the identified set of one or more APIs to be monitored; and reporting the API capability change for the identified set of one or more APIs (Continued)

to be monitored and not reporting the API capability change for APIs not in the identified set.

10 Claims, 7 Drawing Sheets

(51) Int. Cl.
*H04W 24/02* (2009.01)
*H04W 24/10* (2009.01)

(58) Field of Classification Search
USPC .......................................................... 719/310
See application file for complete search history.

(56) References Cited

U.S. PATENT DOCUMENTS

| | | | | |
|---|---|---|---|---|
| 2010/0011109 | A1* | 1/2010 | Lescuyer | H04L 67/14 726/13 |
| 2010/0048175 | A1* | 2/2010 | Osborn | H04W 12/069 455/411 |
| 2017/0093700 | A1* | 3/2017 | Gilley | H04L 45/44 |
| 2022/0405153 | A1* | 12/2022 | Xu | H04W 8/20 |

OTHER PUBLICATIONS

ZTE, et al., "S2-1903956: TS 23.502, Clarification of header compression and other editorial update ," 3GPP TSG-SA2 Meeting #132, Apr. 8-12, 2019, Xi'an, China, 17 pages.
Intention to Grant for European Patent Application No. 20800816.9, dated Dec. 15, 2022, pages.
Notice of Reasons for Refusal for Japanese Patent Application No. 2022-522392, dated Apr. 14, 2023, 6 pages.
Author Unknown, "Technical Specification Group Services and System Aspects; Functional architecture and information flows to support Common API Framework for 3GPP Northbound APIs; Stage 2 (Release 16)," Technical Specification 23.222, Version 16.5.0, Sep. 2019, 3GPP Organizational Partners, 113 pages.
Author Unknown, "Technical Specification Group Services and System Aspects; System Architecture for the 5G System (5GS); Stage 2 (Release 16)," Technical Specification 23.501, Version 16.2.0, Sep. 2019, 3GPP Organizational Partners, 391 pages.
Author Unknown, "Technical Specification Group Services and System Aspects; System Architecture for the 5G System (5GS); Stage 2 (Release 16)," Technical Specification 23.501, Version 16.6.0, Sep. 2020, 3GPP Organizational Partners, 447 pages.
Author Unknown, "Technical Specification Group Services and System Aspects; Procedures for the 5G System (5GS); Stage 2 (Release 16)," Technical Specification 23.502, Version 16.6.0, Sep. 2020, 3GPP Organizational Partners, 597 pages.
Author Unknown, "Technical Specification Group Services and System Aspects; Architecture enhancements to facilitate communications with packet data networks and applications (Release 16)," Technical Specification 23.682, Version 16.8.0, Sep. 2020, 3GPP Organizational Partners, 135 pages.
Author Unknown, "Technical Specification Group Core Network and Terminals; T8 reference point for Northbound APIs; (Release 16)," Technical Specification 29.122, Version 16.3.0, Sep. 2019, 3GPP Organizational Partners, 321 pages.
Author Unknown, "Technical Specification Group Core Network and Terminals; T8 reference point for Northbound APIs; (Release 16)," Technical Specification 29.122, Version 16.7.0, Sep. 2019, 3GPP Organizational Partners, 361 pages.
Author Unknown, "Technical Specification Group Core Network and Terminals; Common API Framework for 3GPP Northbound APIs; (Release 16)," Technical Specification 29.222, Version 16.0.0, Sep. 2019, 3GPP Organizational Partners, 114 pages.
Author Unknown, "Technical Specification Group Core Network and Terminals; 5G System; Network Exposure Function Northbound APIs; Stage 3 (Release 16)," Technical Specification 29.522, Version 16.5.0, Sep. 2020, 3GPP Organizational Partners, 161 pages.
Ericsson, "C3-195xxx: Support API capability change based on API filter," 3GPP TSG-CT WG3 Meeting #107, Change Request, Nov. 11-15, 2019, Reno, Nevada, 17 pages.
Starsinic, et al., "An Overview of 3GPP Exposed Services for IoT Service Platforms," GetMobile, vol. 22, Issue 2, Jun. 2018, pp. 16-21.
International Search Report and Written Opinion for International Patent Application No. PCT/EP2020/080232, dated Feb. 8, 2021, 10 pages.
International Preliminary Report on Patentability for International Patent Application No. PCT/EP2020/080232, dated Jan. 31, 2022, 14 pages.
Author Unknown, "Technical Specification Group Services and System Aspects; General Packet Radio Service (GPRS) enhancements for Evolved Universal Radio Service (GPRS) enhancements for Evolved Universal Terrestrial Radio Access Network (E-UTRAN) access (Release 16)," Technical Specification 23.401, Version 16.4.0, Sep. 2019, 3GPP Organizational Partners, 424 pages.
Final Office Action for Japanese Patent Application No. 2022-522392, dated Jul. 21, 2023, 6 pages.

* cited by examiner

REPORT APPLICATION PROGRAMMING INTERFACE (API) CAPABILITY CHANGE BASED ON API FILTER

This application is a 35 U.S.C. § 371 national phase filing of International Application No. PCT/EP2020/080232, filed Oct. 28, 2020, which claims the benefit of International Application No. PCT/CN2019/114816, filed Oct. 31, 2019, the disclosures of which are incorporated herein by reference in their entireties.

TECHNICAL FIELD

The present disclosure relates to wireless communication system and, more specifically, to Application Programming Interface (API) capability change notification based on an API filter such that a API capability change notification contains information about API capability changes for only the subset of APIs specified in an API list that was provided as part of the subscription request.

BACKGROUND

Third Generation Partnership Project (3GPP) networks provide different kinds of capabilities, such as monitoring capability, provisioning capability, policy/charging capability, and analytics reporting capability, initially for Internet of Things (IoT) devices. Such capability may also be used in other type of devices, such as enhanced Mobile Broadband (eMBB) User Equipment (UE). Communications networks are generally comprised of a Radio Access Network (RAN) and a Core Network (CN). The core network for Fourth Generation (4G) networks, such as Long Term Evolution (LTE) networks, is known as the Evolved Packet Core (EPC). The core network for Fifth Generation (5G) networks is known as the 5G Core (5GC). Generally speaking, telecommunication core networks are "closed," meaning that access to the core network is tightly controlled and not available to the public. However, there can be benefits to allowing an Application Function (AF) external to the core network to have limited access to some of the core network functions and vice versa.

For this reason, both 4G networks and 5G networks include a Network Function (NF) that allows AFs or other entities outside of the core network to find out what nodes, capabilities, or features are supported by the core network. Such a network function is referred to as an "exposure function," since it exposes the otherwise hidden capabilities of the network to entities outside of the network. In EPC, this function is the Service Capability Exposure Function (SCEF), and in 5GC, this function is the Network Exposure Function (NEF). That is, a SCEF is the entry point for providing such exposure capability in EPC and a NEF is the entry point providing such exposure capability in 5GC. An AF interacts with an exposure function via a set of one or more Application Programming Interfaces (APIs).

In order to make AF be agnostic to SCEF and NEF, starting from 3GPP Release 16, a combined exposure node is required (i.e., SCEF+NEF). However, the EPC and 5GC have different capabilities and thus have different sets of APIs.

Because the combined SCEF+NEF provides exposure capability for both EPC and 5GC, an AF that uses the SCEF+NEF needs to know whether the SCEF+NEF is an entry point into an EPC or whether it is an entry point into a 5GC. This is important, for example, in the scenario in which a UE changes from an EPC to a 5GC or vice versa, or in any other scenario where the new core network has different capabilities than the old core network had.

This issue was partially addressed in 3GPP Technical Specification (TS) 23.501, version 5.17.6.1 (hereinafter, "TS 23.501"). TS 23.501 notes the following:

A service related with a common north-bound API may become unavailable due to the UE being served by a CN node not supporting the service. If the availability or expected level of support of a service API associated with a UE changes, for example due to mobility between a 5GC and an EPC, the AF shall be made aware of the change. If the Common API Framework (CAPIF) is supported, and if the service APIs become (un)available for the 5GC or EPC network, the AF obtains such information from the CAPIF core function.

If the SCEF+NEF receives the subscription request from the AF for the availability or expected level of support of a service API, the SCEF+NEF subscribes a CN Type Change event for the UE or Group of UEs to the Home Subscriber Server (HSS)+Unified Data Management (UDM) node (HSS+UDM). If the HSS+UDM receives a subscription for a CN Type Change event, the HSS+UDM includes the latest CN type for the UE or group of UEs in the response for the subscription.

If the HSS+UDM detects that the UE switches between being served by an MME (in EPC) and being served by an AMF (in 5GC), the CN Type Change event is triggered, and the HSS+UDM notifies the latest CN type for the UE or group of UEs to the SCEF+NEF. Based on the CN type information, the SCEF+NEF can determine the availability or expected level of support of a given service. The AF will be informed of such information via a subscription/notification service operation. The AF can subscribe for the availability or expected level of support of a service API with report type indicating either One-time report or Continuous report.

If there is no CN type information for the UE in the SCEF+NEF, the SCEF+NEF subscribes event monitoring for a new CN Type Change event for the UE or group of UEs to the HSS+UDM; otherwise, the SCEF+NEF determines the CN type locally in the following conditions:

If the AF subscribes with report type indicating Onetime report, the SCEF+NEF may consider the Freshness Timer of the latest CN type information for the UE or Group of UEs. The Freshness Timer is a parameter that is configured based on local SCEF+NEF policy. When a subscription request with Onetime report type is received the SCEF+NEF checks if there is the latest CN type information received from the HSS+UDM for the indicated UE ID or External Group ID. If the elapsed time for the CN type information since the last reception is less than the Freshness Timer, then the SCEF+NEF may respond to the AF with the latest CN type information in order to avoid repeated query to HSS+UDM.

The SCEF+NEF has established a direct connection with MME or AMF or SMF.

When the UE or all members of a group of UEs are being served by a MME, the CN type is determined to be "EPC." When the UE or all members of a group of UEs are being served by an AMF, the CN type is determined to be "5GC." When the UE is registered both in EPC and 5GC, or some members of a group of UEs are registered in EPC while some members are registered in 5GC, the CN type is determined to be "5GC+EPC." If 5GC+EPC is determined as the CN type serving the UE or the group of UEs, the SCEF+NEF determines that service APIs for both 5GC and EPC are available to the UE or the group of UEs.

In order to support monitoring of the availability or expected level of support of a service API, TS 29.122 re-uses the MonitoringEvent API to support the event "API support capability change." An AF is thus able to subscribe to SCEF+NEF for such an event and then be notified about the 3GPP system level support for the exposure APIs and the supported feature for each API.

SUMMARY

In a real deployment, not all APIs are supported by an AF. In conventional systems, when a AF subscribes to the API support capability change event, the AF is notified about all of the APIs supported by that system, whether or not the AF is interested in all of those APIs. This creates a signalling impact for the network due to unnecessary information in the event notification. Currently, there are approximately 20 APIs in the network capability exposure, with more predicted to be added in the future. This means that more and more unnecessary information will be conveyed to the AF.

The present disclosure provides a new event filter for the API support capability change event. This event filter operates to limit the amount of information sent over the network to an Application Function (AF) that has subscribed to the API support capability change event. In some embodiments, the event filter identifies the API(s) in which the AF is interested, e.g., by API name.

According to one aspect of the present disclosure, a method for reporting Application Programming Interface (API) capability change according to an API filter comprises: at a first node within a telecommunication core network: receiving, from a requesting entity, a request to be notified of an API capability change related to an identified wireless device, the request identifying a set of one or more APIs to be monitored; subscribing to receive notifications of a core network type change for the identified wireless device; receiving a notification that the identified wireless device has changed from a first type of core network to a second type of core network; determining an API capability change from the first type of core network to the second type of core network for the identified set of one or more APIs to be monitored; and reporting, to the requesting entity, the API capability change for the identified set of one or more APIs to be monitored and not reporting the API capability change for APIs not in the identified set.

In some embodiments, the first node comprises a node for exposing services and capabilities of a telecommunication core network to entities outside of the telecommunication core network.

In some embodiments, the first node comprises a Service Capability Exposure Function (SCEF), a Network Exposure Function (NEF), or a combined SCEF+NEF.

In some embodiments, the requesting entity comprises an Application Function (AF), a Service Capability Server (SCS), and/or an Application Server (AS).

In some embodiments, receiving the request to be notified of an API capability change related to an identified wireless device comprises receiving a monitoring request.

In some embodiments, subscribing to receive notifications of a core network type change for the identified wireless device comprises sending a subscribe request to a node comprising a Home Subscriber Server (HSS), a Unified Data Management function (UDM), or a combined HSS+UDM.

In some embodiments, subscribing to receive notifications of a core network type change for the identified wireless device comprises sending a Nudm_EventExposure_Subscribe Request.

In some embodiments, receiving a notification that the identified wireless device has changed from a first type of core network to a second type of core network comprises receiving a Nudm_EventExposure_Notify Response.

In some embodiments, reporting the API capability change comprises sending a monitoring indication request.

According to another aspect of the present disclosure, a method for reporting API capability change according to an API filter comprises: at a requesting entity: sending, to a first node within a telecommunication core network, a request to be notified of an API capability change related to an identified wireless device, the request identifying a set of one or more APIs to be monitored; and receiving, from the first node, a notification of an API capability change related to the identified wireless device, the notification including the API capability change for the identified set of one or more APIs to be monitored and not including an API capability change for APIs not in the identified set.

In some embodiments, sending the request to the first node comprises sending the request to a node for exposing services and capabilities of a telecommunication core network to entities outside of the telecommunication core network.

In some embodiments, the first node comprises a SCEF, a NEF, or a combined SCEF+NEF.

In some embodiments, the requesting entity comprises an AF, a SCS, and/or an AS.

In some embodiments, sending the request to be notified of an API capability change related to an identified wireless device comprises sending a monitoring request.

In some embodiments, receiving the notification of an API capability change related to the identified wireless device comprises receiving a monitoring indication request.

According to another aspect of the present disclosure, a network node for reporting API capability change according to an API filter comprises: one or more processors; and memory storing instructions executable by the one or more processors, whereby the network node is operable to: receive, from a requesting entity, a request to be notified of an API capability change related to an identified wireless device, the request identifying a set of one or more APIs to be monitored; subscribe to receive notifications of a core network type change for the identified wireless device; receive a notification that the identified wireless device has changed from a first type of core network to a second type of core network; determine an API capability change from the first type of core network to the second type of core network for the identified set of one or more APIs to be monitored; and report, to the requesting entity, the API capability change for the identified set of one or more APIs to be monitored and not reporting the API capability change for APIs not in the identified set.

In some embodiments, the network node is enabled to perform any of the exposure function methods described herein.

According to another aspect of the present disclosure, a network node configured for reporting API capability change according to an API filter comprises processing circuitry adapted to: receive, from a requesting entity, a request to be notified of an API capability change related to an identified wireless device, the request identifying a set of one or more APIs to be monitored; subscribe to receive notifications of a core network type change for the identified wireless device; receive a notification that the identified wireless device has changed from a first type of core network to a second type of core network; determine an API capability change from the first type of core network to the second type of core network for the identified set of one or more APIs to be monitored; and report, to the requesting entity, the API capability change for the identified set of one or more APIs to be monitored and not reporting the API capability change for APIs not in the identified set.

In some embodiments, the network node is enabled to perform any of the exposure function methods described herein.

According to another aspect of the present disclosure, a network node for reporting API capability change according to an API filter comprises modules adapted to: receive, from a requesting entity, a request to be notified of an API capability change related to an identified wireless device, the request identifying a set of one or more APIs to be monitored; subscribe to receive notifications of a core network type change for the identified wireless device; receive a notification that the identified wireless device has changed from a first type of core network to a second type of core network; determine an API capability change from the first type of core network to the second type of core network for the identified set of one or more APIs to be monitored; and report, to the requesting entity, the API capability change for the identified set of one or more APIs to be monitored and not reporting the API capability change for APIs not in the identified set.

In some embodiments, the network node is enabled to perform any of the exposure function methods described herein.

According to another aspect of the present disclosure, a network node for reporting API capability change according to an API filter comprises: one or more processors; and memory storing instructions executable by the one or more processors, whereby the network node is operable to: send, to a first node within a telecommunication core network, a request to be notified of an API capability change related to an identified wireless device, the request identifying a set of one or more APIs to be monitored; and receive, from the first node, a notification of an API capability change related to the identified wireless device, the notification including the API capability change for the identified set of one or more APIs to be monitored and not including an API capability change for APIs not in the identified set.

In some embodiments, the network node is enabled to perform any of the application function methods described herein.

According to another aspect of the present disclosure, a network node configured for reporting API capability change according to an API filter comprises processing circuitry adapted to: send, to a first node within a telecommunication core network, a request to be notified of an API capability change related to an identified wireless device, the request identifying a set of one or more APIs to be monitored; and receive, from the first node, a notification of an API capability change related to the identified wireless device, the notification including the API capability change for the identified set of one or more APIs to be monitored and not including an API capability change for APIs not in the identified set.

In some embodiments, the network node is enabled to perform any of the application function methods described herein.

According to another aspect of the present disclosure, a network node for reporting API capability change according to an API filter comprises modules adapted to: send, to a first node within a telecommunication core network, a request to be notified of an API capability change related to an identified wireless device, the request identifying a set of one or more APIs to be monitored; and receive, from the first node, a notification of an API capability change related to the identified wireless device, the notification including the API capability change for the identified set of one or more APIs to be monitored and not including an API capability change for APIs not in the identified set.

In some embodiments, the network node is enabled to perform any of the application function methods described herein.

The advantages provided by the present disclosure include, but are not limited to, improved signaling transmission to avoid including unneeded or unused information in the event notification message(s) and flexible event subscription from the AF's perspective, e.g., the AF can get information for all APIs or only some of the APIs.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
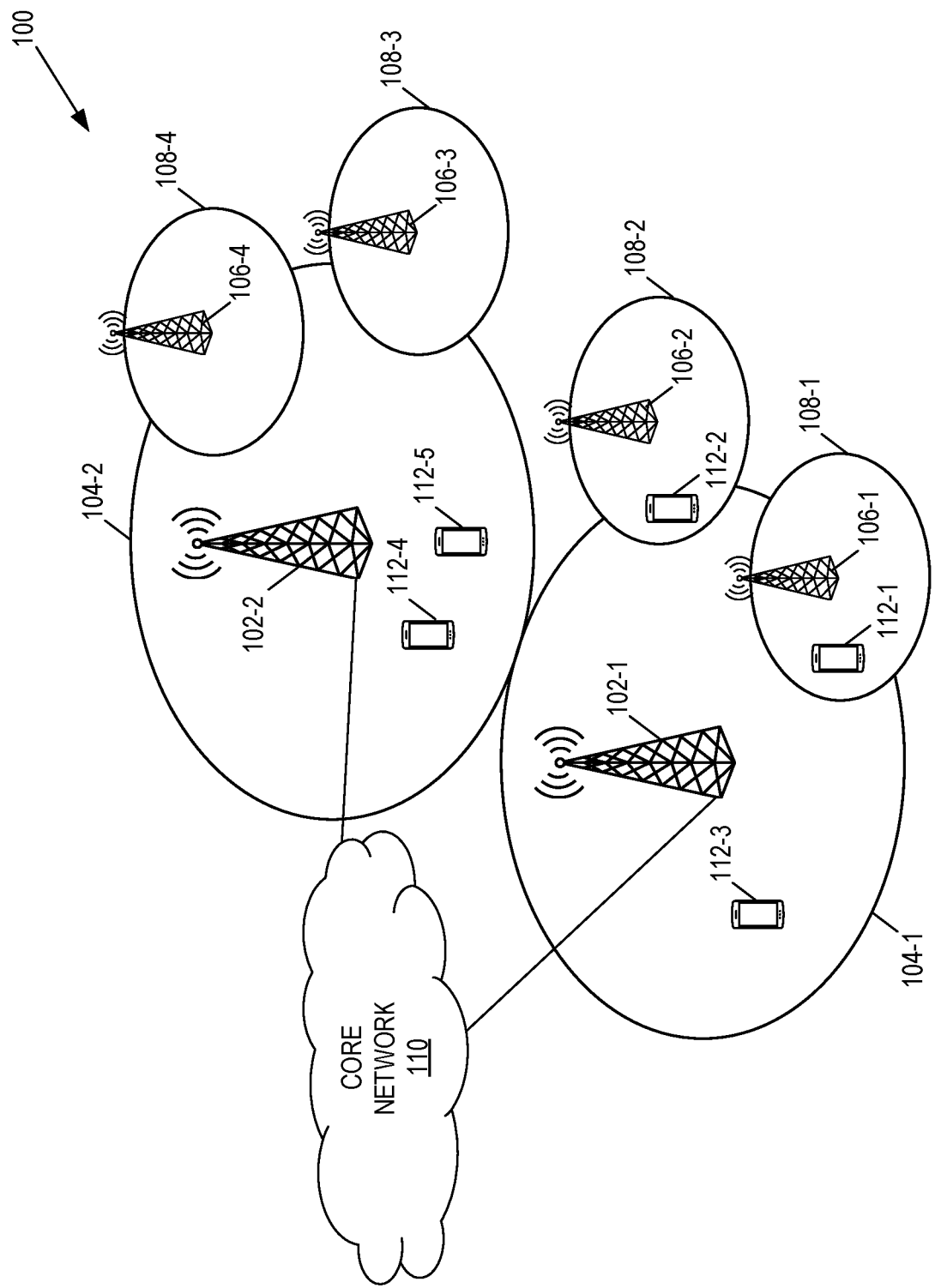
FIG. 1 illustrates one example of a cellular communications network according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Core Access and Mobility Management Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1

FIG. 1 illustrates one example of a cellular communications system 100 in which embodiments of the present disclosure may be implemented. The subject matter disclosed herein addresses a specific problem that may occur when a UE changes from a 5G network to an LTE network of vice versa, and thus the cellular communications system 100 may be a 5G system (5GS) including a NR RAN or LTE RAN (i.e., E-UTRA RAN), an Evolved Packet System (EPS) including a LTE RAN, or both. In this example, the RAN includes base stations 102-1 and 102-2, which in LTE are referred to as eNBs (when connected to EPC) and in 5G NR are referred to as gNBs (LTE RAN nodes connected to 5GC are referred to as gn-eNBs), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G core (5GC). The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

FIG. 2

Figure 2:
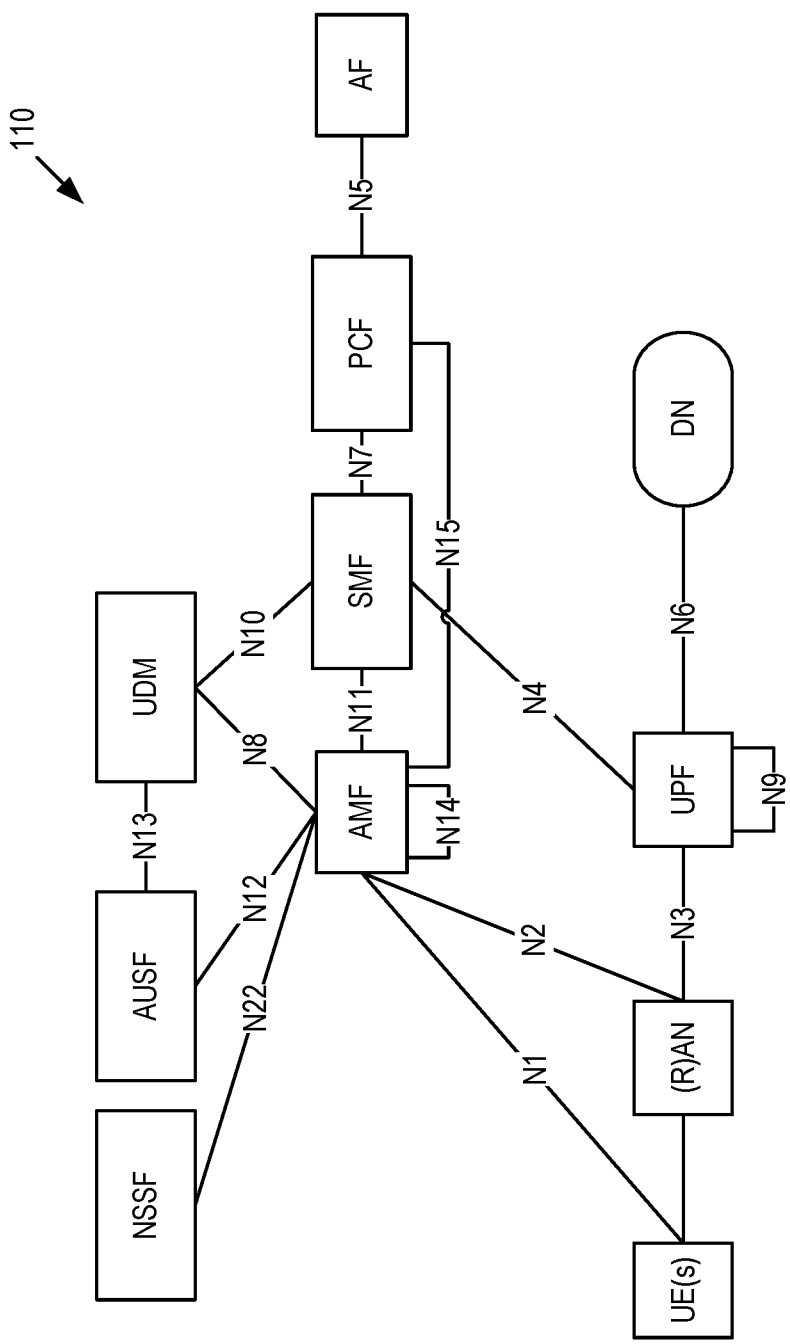
FIG. 2 illustrates a wireless communication system represented as a 5G network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/ interface. FIG. 2 can be viewed as one particular implementation of the system 100 of FIG. 1.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the (R)AN comprises base stations, e.g., such as evolved Node Bs (eNBs) or NR base stations (gNBs) or similar. Seen from the core network side, the 5G core NFs shown in FIG. 2 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

FIG. 3

Figure 3:
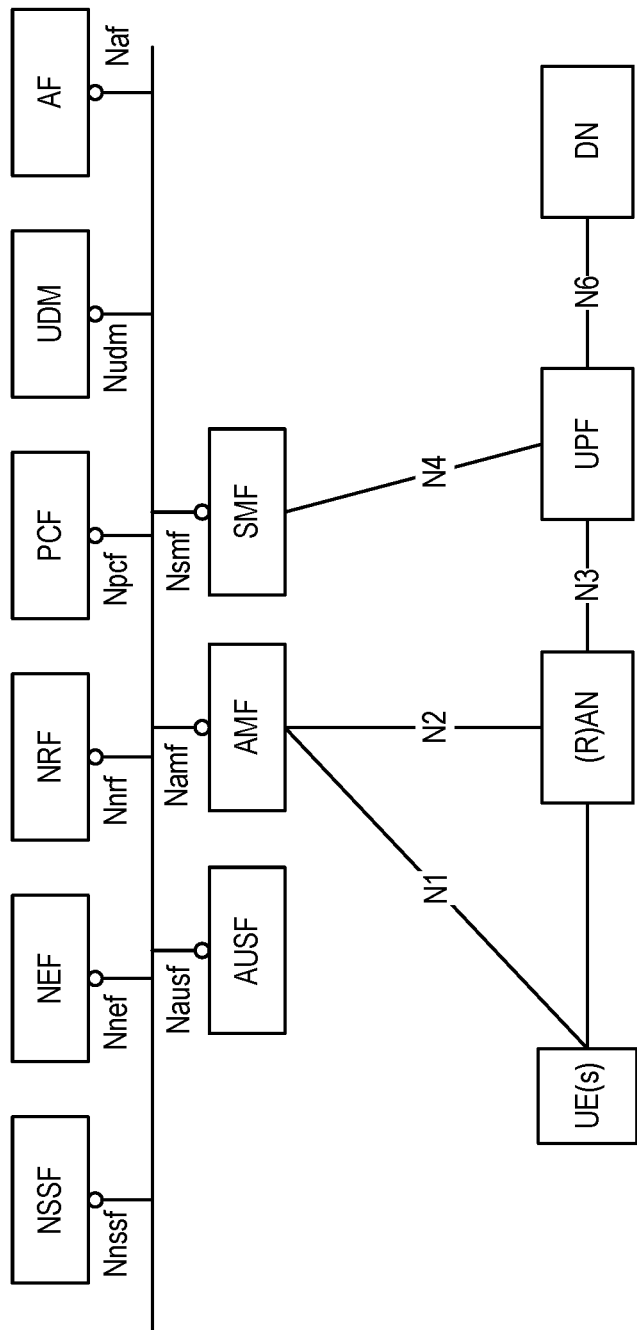
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g., Namf for the service based interface of the AMF and Nsmf for the service based interface of the SMF etc. The Network Exposure Function (NEF) and the Network Function (NF) Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

FIG. 4

Figure 4:
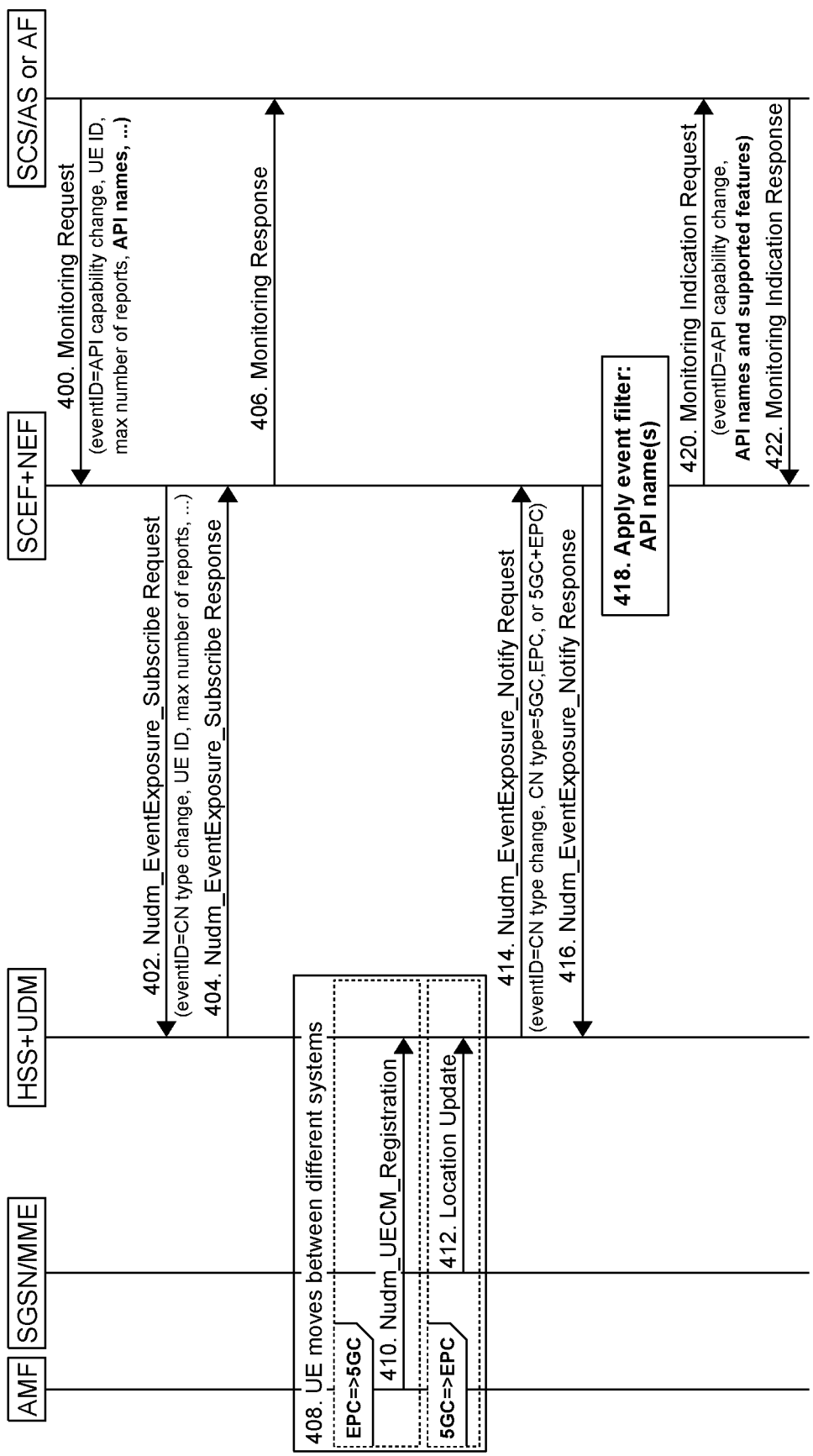
FIG. 4 is a signaling graph showing messages exchanged during an exemplary process for Application Programming Interface (API) capability change notification based on an API filter according to some embodiments of the present disclosure.

FIG. 4 is a signaling graph showing messages exchanged during an exemplary process for Application Programming Interface (API) capability change notification based on an API filter according to some embodiments of the present disclosure. In the embodiment illustrated in FIG. 4, the process includes the following steps:

Step 400. A requesting entity, such as an Application Function (AF), Service Capability Server (SCS), or Application Server (AS), sends a monitoring request to a combined Service Capability Exposure Function (SCEF) and Network Exposure Function (NEF), referred to as a SCEF+NEF. In the embodiment illustrated in FIG. 4, the monitoring request specifies that the requesting entity wants to monitor the API Capability Change events for a specified UE (identified by UE ID), and further includes a list of API names or other means by which to specify the API or APIs in which the requesting entity is interested.

Step 402. The SCEF+NEF sends a subscribe request to a Home Subscriber Server (HSS) and Unified Data Management (UDM) function, referred to as a HSS+UDM. In the embodiment illustrated in FIG. 4, the subscribe request specifies that the SCEF+NEF wants to be notified when a CN Type Change event occurs for the specified UE. In some embodiments, the subscribe request comprises a Nudm_EventExposure_Subscribe request, and may include parameters such as an event ID, a UE ID, a maximum number of reports, etc.

Step 404. The HSS+UDM responds to the subscribe request by sending a subscribe response back to the SCEF+NEF. In the embodiment illustrated in FIG. 4, the subscribe response comprises a Nudm_EventExposure_Subscribe response.

Step 406. The SCEF+NEF sends a monitoring response to the entity that issued the monitoring request. Example responses include notification that the monitor request was received, that the monitor request was granted or denied, etc. In the embodiment illustrated in FIG. 4, the monitor request was granted.

Step 408. The UE moves between different systems, and the HSS+UDM receives notification of this fact. For example, if the UE moves from an EPC to a 5GC, the HSS+UDM may receive a Nudm_UECM_Registration message (step 410) from a 5GC Core Access and Mobility Management Function (AMF). If the UE moves from a 5GC to an EPC, the HSS+UDM may receive a Location Update message (step 412) from a Serving General Packet Radio Service (GPRS) Support Node (SGSN) or a Mobility Management Entity (MME).

Step 414. In response to determining that the UE has changed from one CN type to another (e.g., from EPC to 5GC or from 5GC to EPC), the HSS+UDM notifies the SCEF+NEF of this fact. In the embodiment illustrated in FIG. 4, the HSS+UDM sends a Nudm_EventExposure_Notify Request to the SCEF+NEF, and may include parameters such as eventID, CN type, UE ID, etc.

Step 416. The SCEF+NEF responds to the notification from the HSS+UDM. In the embodiment illustrated in FIG. 4, the SCEF+NEF sends a Nudm_ExposureEvent_Notify Response to the HSS+UDM.

Step 418. The SCEF+NEF determines that the requesting entity (i.e., the AF) is monitoring the UE that changed and has requested to be notified when there is an API capability change. Further, the SCEF+NEF determines that the AF wants to be notified of an API capability change to a particular subset of APIs, e.g., the APIs identified in the monitoring request sent at step 400. That is, the SCEF+NEF applies the event filters to filter out all but the APIs in which the AF has indicated an interest.

Step 420. The SCEF+NEF notifies the requesting entity of the API capability change for those APIs in which the AF has indicated an interest. In the embodiment illustrated in FIG. 4, the SCEF+NEF issues a Monitoring Indication Request to the AF, which may include parameters such as event ID (indicating an API capability change) and a list of API names and their respective supported features.

Step 422. The requesting entity sends a Monitoring Indication Response to the SCEF+NEF.

Example Implementations

The following changes to 3GPP TS 29.122 are proposed.

* 1st Change to 3GPP TS 29.122 *

4.4.2.2.2.1 General

The following monitoring events: ~~; Loss of connectivity, UE~~ reachability, Location ~~Reporting, Change of IMSI-IMEI(SV) Association,~~ Roaming Status, Communication Failure ~~and Availability after DNN Failure~~ are applicable for the monitoring event configuration via HSS for an individual UE or a group of UEs:[[.]]

- Loss of connectivity;
- UE reachability;
- Location Reporting;
- Change of IMSI-IMEI(SV) Association:
- Roaming Status;
- Communication Failure;
- Availability after DNN Failure; and
- API support capability.

Only one-time reporting is supported if the "reachabilityType"" attribute sets to ""SMS" for the event UE reachability, if the "locationType" attribute sets to "LAST_KNOWN_LOCATION" for the event Location Reporting in the monitoring event request.

* Next Change to 3GPP TS 29.122 *

5.3.2.1.2   Type: MonitoringEventSubscription

This type represents a subscription to monitoring an event.
The same structure is used in the subscription request and
subscription response.

TABLE 5.3.2.1.2-1

Definition of type MonitoringEventSubscription

| Attribute name | Data type | Cardinality | Description | Applicability (NOTE 3) |
|---|---|---|---|---|
| self | Link | 0 . . . 1 | Link to the resource "Individual Monitoring Event Subscription". This parameter shall be supplied by the SCEF in HTTP responses. | |
| supportedFeatures | SupportedFeatures | 0 . . . 1 | Used to negotiate the supported optional features of the API as described in subclause 5.2.7. This attribute shall be provided in the POST request and in the response of successful resource creation. | |
| mtcProviderId | string | 0 . . . 1 | Identifies the MTC Service Provider and/or MTC Application. (NOTE 7) | |
| externalId | ExternalId | 0 . . . 1 | Identifies a user as defined in Clause 4.6.2 of 3GPP TS 23.682 [2]. (NOTE 1) | (NOTE 5) |
| msisdn | Msisdn | 0 . . . 1 | Identifies the MS internal PSTN/ISDN number allocated for a UE. (NOTE 1) | (NOTE 5) |
| externalGroupId | ExternalGroupId | 0 . . . 1 | Identifies a user group as defined in Clause 4.6.2 of 3GPP TS 23.682 [2]. (NOTE 1) (NOTE 6) | |
| addExtGroupIds | array(ExternalGroupId) | 0 . . . N | Identifies user groups as defined in Clause 4.6.2 of 3GPPTS 23.682 [2]. (NOTE 1) (NOTE 6) | Number_of_UEs_in_an_area_notification, Number_of_UEs_in_an_area_notification_5G |
| ipv4Addr | Ipv4Addr | 0 . . . 1 | Identifies the Ipv4 address. (NOTE 1) | Location_notification, Communication_failure_notification |
| ipv6Addr | Ipv6Addr | 0 . . . 1 | Identifies the Ipv6 address. (NOTE 1) | Location_notification, Communication_failure_notification |
| notificationDestination | Link | 1 | An URI of a notification destination that T8 message shall be delivered to. | |
| requestTestNotification | boolean | 0 . . . 1 | Set to true by the SCS/AS to request the SCEF to send a test notification as defined in subclause 5.2.5.3. Set to false or omitted otherwise. | Notification_test_event |
| websockNotifConfig | WebsockNotifConfig | 0 . . . 1 | Configuration parameters to set up notification delivery over Websocket protocol as defined in subclause 5.2.5.4. | Notification_websocket |
| monitoringType | MonitoringType | 1 | Enumeration of monitoring type. Refer to clause 5.3.2.4.3. | |
| maximumNumberOfReports | integer | 0 . . . 1 | Identifies the maximum number of event reports to be generated by the HSS, MME/SGSN as specified in subclause 5.6.0 of 3GPP TS 23.682 [2]. (NOTE 2) | |
| monitorExpireTime | DateTime | 0 . . . 1 | Identifies the absolute time at which the related monitoring event request is considered to expire, as specified in subclause 5.6.0 of 3GPP TS 23.682 [2]. (NOTE 2) | |
| groupReportGuardTime | DurationSec | 0 . . . 1 | Identifies the time for which the SCEF can aggregate the monitoring event reports detected by the UEs in a group and report them together to the SCS/AS, as specified in subclause 5.6.0 of 3GPP TS 23.682 [2]. | |
| maximumDetectionTime | DurationSec | 0 . . . 1 | If "monitoringType" is "LOSS_OF_CONNECTIVITY", this parameter may be included to identify the maximum period of time after which the UE is considered to be unreachable. | Loss_of_connectivity_notification |
| reachabilityType | ReachabilityType | 0 . . . 1 | If "monitoringType" is "UE_REACHABILITY", this parameter shall be included to identify whether the request is for "Reachability for SMS" or "Reachability for Data". | Ue-reachability_notification |

TABLE 5.3.2.1.2-1-continued

Definition of type MonitoringEventSubscription

| Attribute name | Data type | Cardinality | Description | Applicability (NOTE 3) |
|---|---|---|---|---|
| maximumLatency | DurationSec | 0 . . . 1 | if "monitoringType" is "UE_REACHABILITY", this parameter may be included to identify the maximum delay acceptable for downlink data transfers. | Ue-reachability_notification |
| maximumResponseTime | DurationSec | 0 . . . 1 | if "monitoringType" is "UE_REACHABILITY", this parameter may be included to identify the length of time for which the UE stays reachable to allow the SCS/AS to reliably deliver the required downlink data. | Ue-reachability_notification |
| suggestedNumberOfDlPackets | integer | 0 . . . 1 | If "monitoringType" is "UE_REACHABILITY", this parameter may be included to identify the number of packets that the serving gateway shall buffer in case that the UE is not reachable. | Ue-reachability-notification |
| idleStatusIndication | boolean | 0 . . . 1 | If "monitoringType" is set to "UE_REACHABILITY" or "AVAILABILITY_AFTER_DDN_FAILURE", this parameter may be included to indicate the notification of when a UE, for which PSM is enabled, transitions into idle mode. "true": indicate enabling of notification "false": indicate no need to notify Default: "false". | Ue-reachability_notification, Availability_after_DDN_failure_notification, Availability_after_DDN_failure_notification_enhancement |
| locationType | LocationType | 0 . . . 1 | if "monitoringType" is "LOCATION_REPORTING" or "NUMBER_OF_UES_IN_AN_AREA", this parameter shall be included to identify whether the request is for Current Location or Last known Location. (NOTE 4) | Location_notification, Number_of_UEs_in_an_area_notification, Number_of_UEs_in_an_area_notification_5G |
| accuracy | Accuracy | 0 . . . 1 | if "monitoringType" is "LOCATION_REPORTING", this parameter may be included to identify the desired level of accuracy of the requested location information, as described in subclause 4.9.2 of 3GPP TS 23.682 [2]. | Location_notification |
| minimumReportInterval | DurationSec | 0 . . . 1 | If "monitoringType" is "LOCATION_REPORTING", this parameter may be included to identify a minimum time interval between Location Reporting notifications. | Location_notification |
| associationType | AssociationType | 0 . . . 1 | If "monitoringType" is "CHANGE_OF_IMSI_IMEI_ASSOCIATION", this parameter shall be included to identify whether the change of IMSI-IMEI or IMSI-IMEISV association shall be detected. | Change_of_IMSI_IMEI_association_notification |
| plmnIndication | boolean | 0 . . . 1 | If "monitoringType" is "ROAMING_STATUS", this parameter may be included to indicate the notification of UE's Serving PLMN ID. "true": The value shall be used to indicate enabling of notification; "false": The value shall be used to indicate disabling of notification. Default: "false". | Roaming_status_notification |
| locationArea | LocationArea | 0 . . . 1 | If "monitoringType" is "NUMBER_OF_UES_IN_AN_AREA", this parameter may be included to indicate the area within which the SCS/AS requests the number of UEs. | Number_of_UEs_in_an_area_notification |
| locationArea5G | LocationArea5G | 0 . . . 1 | If "monitoringType" is "NUMBER_OF_UES_IN_AN_AREA", this parameter may be included to indicate the area within which the AF requests the number of UEs. | Number_of_UEs_in_an_area_notification_5G |

TABLE 5.3.2.1.2-1-continued

Definition of type MonitoringEventSubscription

| Attribute name | Data type | Cardinality | Description | Applicability (NOTE 3) |
|---|---|---|---|---|
| dddTraDes | DddTrafficDescriptor | 0 ... 1 | The traffic descriptor of the downlink data source. May be included for event "DOWNLINK_DATA_DELIVERY_STATUS" or "AVAILABILITY_AFTER_DDN_FAILURE". | Downlink_data_delivery_status_5G, Availability_after_DDN_failure_notification_enhancement |
| dddStati | array(DddStatus) | 0 ... N | May be included for event "DOWNLINK_DATA_DELIVERY_STATUS". The subscribed stati (delivered, transmitted, buffered) for the event. If omitted all stati are subscribed. | Downlink_data_delivery_status_5G |
| apiNames | array(string) | 0 ... N | Each element identifies the name of an API. It shall set as {apiName} part of the URI structure for each T8 or N33 API as defined in the present specification or 3GPP TS 29.522 [TS29522], respectively. This allows the SCS/AS to request the capability change for the listed APIs (which are also supported by the SCEF + NEF). If it is omitted, the SCS/AS requests to be notified for capability change for all APIs the SCEF + NEF supports. | API support capability notification |
| monitoringEventReport | MonitoringEventReport | 0 ... 1 | Identifies a monitoring event report which is sent from the SCEF to the SCS/AS. | |

NOTE 1:
One of the properties "externalId", "msisdn", "ipv4Addr", "ipv6Addr" or "externalGroupId" shall be included for features "Location_notification" and "Communication_failure_notification";. "ipv4Addr" or "ipv6Addr" is required for monitoring via the PCRF for an individual UE. One of the properties "externalId", "msisdn" or "externalGroupId" shall be included for features "Pdn_connectivity_status", "Loss_of_connectivity_notification", "Ue-reachability_notification", "Change_of_IMSI_IMEI_association_notification", "Roaming_status_notification", "Availability_after_DDN_failure_notification" and "Availability_after_DDN_failure_notification_enhancement";;
NOTE 2:
Inclusion of either "maximumNumberOfReports" (with a value higher than 1) or "monitorExpireTime" makes the Monitoring Request a Continuous Monitoring Request, where the SCEF sends Notifications until either the maximum number of reports or the monitoring duration indicated by the property "monitorExpireTime" is exceeded. The "maximumNumberOfReports" with a value 1 makes the Monitoring Request a One-time Monitoring Request. At least one of "maximumNumberOfReports" or "monitorExpireTime" shall be provided.
NOTE 3:
Properties marked with a feature as defined in subclause 5.3.4 are applicable as described in subclause 5.2.7. If no features are indicated, the related property applies for all the features.
NOTE 4:
In this release, for features "Number_of_UEs_in_an_area_notification" and "Number_of_UEs_in_an_area_notification_5G", locationType shall be set to "LAST_KNOWN_LOCATION".
NOTE 5:
The property does not apply for the features "Number_of_UEs_in_an_area_notification" and "Number_of_UEs_in_an_area_notification_5G".
NOTE 6:
For the features "Number_of_UEs_in_an_area_notification" and "Number_of_UEs_in_an_area_notification_5G", the property "externalGroupId" may be included for single group and "addExtGroupIds" may be included for multiple groups but not both.
NOTE 7:
The SCEF should check received MTC provider identifier and then the SCEF may: override it with local configured value and send it to HSS; send it directly to the HSS; or reject the monitoring configuration request.

* Next Change to 3GPP TS 29.122 *

A.3 MonitoringEvent API
openapi: 3.0.0
info:
  title: 3gpp-monitoring-event
  version: 1.1.0. alpha-3
  description: |
    API for Monitoring Event.
    © 2019, 3GPP Organizational Partners (ARIB, ATIS, CCSA, ETSI, TSDSI, TTA, TTC).
    All rights reserved.
externalDocs :
  description: 3GPP TS 29.122 V16.3.0 T8 reference point for Northbound APIs
  url: 'http://www.3gpp.org/ftp/Specs/archive/29_series/29.122/'
security:
  - { }
  - oAuth2ClientCredentials: [ ]

-continued

* Next Change to 3GPP TS 29.122 *

```
servers:
  - url: '{apiRoot}/3gpp-monitoring-event/v1'
    variables:
      apiRoot:
        default: https://example.com
        description: apiRoot as defined in subclause 5.2.4 of 3GPP TS 29.122.
paths:
  /{scsAsId}/subscriptions:
    get:
      summary: read all of the active subscriptions for the SCS/AS
      tags:
        - MonitoringEvent API SCS/AS level GET Operation
      parameters:
        - name: scsAsId
          in: path
          description: Identifier of the SCS/AS
          required: true
          schema:
            type: string
      responses:
        '200':
          description: OK (Successful get all of the active subscriptions for the SCS/AS)
          content:
            application/json:
              schema:
                type: array
                items:
                  $ref: '#/components/schemas/MonitoringEventSubscription'
                minItems: 0
                description: Monitoring event subscriptions
        '400':
          $ref: 'TS29122_CommonData.yaml#/components/responses/400'
        '401':
          $ref: 'TS29122_CommonData.yaml#/components/responses/401'
        '403':
          $ref: 'TS29122_CommonData.yaml#/components/responses/403'
        '404':
          $ref: 'TS29122_CommonData.yaml#/components/responses/404'
        '406':
          $ref: 'TS29122_CommonData.yaml#/components/responses/406'
        '429':
          $ref: 'TS29122_CommonData.yaml#/components/responses/429'
        '500':
          $ref: 'TS29122_CommonData.yaml#/components/responses/500'
        '503':
          $ref: 'TS29122_CommonData.yaml#/components/responses/503'
        default:
          $ref: 'TS29122_CommonData.yaml#/components/responses/default'
    post:
      summary: Creates a new subscription resource for monitoring event notification
      tags:
        - MonitoringEvent API Subscription level POST Operation
      parameters:
        - name: scsAsId
          in: path
          description: Identifier of the SCS/AS
          required: true
          schema:
            type: string
      requestBody:
        description: Subscription for notification about monitoring event
        required: true
        content:
          application/json:
            schema:
              $ref: '#/components/schemas/MonitoringEventSubscription'
      callbacks:
        notificationDestination:
          '{request.body#/notificationDestination}':
            post:
              requestBody: # contents of the callback message
                required: true
                content:
                  application/json:
                    schema:
                      $ref: '#/components/schemas/MonitoringNotification'
```

-continued

* Next Change to 3GPP TS 29.122 *

```
          responses:
            '204':
              description: No Content (successful notification)
            '400':
              $ref: 'TS29122_CommonData.yaml#/components/responses/400'
            '401':
              $ref: 'TS29122_CommonData.yaml#/components/responses/401'
            '403':
              $ref: 'TS29122_CommonData.yaml#/components/responses/403'
            '404':
              $ref: 'TS29122_CommonData.yaml#/components/responses/404'
            '411':
              $ref: 'TS29122_CommonData.yaml#/components/ responses/411'
            '413':
              $ref: 'TS29122_CommonData.yaml#/components/responses/413'
            '415':
              $ref: 'TS29122_CommonData.yaml#/components/responses/415'
            '429':
              $ref: 'TS29122_CommonData.yaml#/components/responses/429'
            '500':
              $ref: 'TS29122_CommonData.yaml#/components/responses/500'
            '503':
              $ref: 'TS29122_CommonData.yaml#/components/responses/503'
            default:
              $ref: 'TS29122_CommonData.yaml#/components/responses/default'
      responses:
        '201':
          description: Created (Successful creation of subscription)
          content:
            application/json:
              schema:
                $ref: '#/components/schemas/MonitoringEventSubscription'
          headers:
            Location:
              description: 'Contains the URI of the newly created resource'
              required: true
              schema:
                type: string
        '200':
          description: The operation is successful and immediate report is included.
          content:
            application/json:
              schema:
                $ref: '#/components/schemas/MonitoringEventReport'
        '400':
          $ref: 'TS29122_CommonData.yaml#/components/responses/400'
        '401':
          $ref: 'TS29122_CommonData.yaml#/components/responses/401'
        '403':
          $ref: 'TS29122_CommonData.yaml#/components/responses/403'
        '404':
          $ref: 'TS29122_CommonData.yaml#/components/responses/404'
        '411':
          $ref: 'TS29122_CommonData.yaml#/components/responses/411'
        '413':
          $ref: 'TS29122_CommonData.yaml#/components/responses/413'
        '415':
          $ref: 'TS29122_CommonData.yaml#/components/responses/415'
        '429':
          $ref: 'TS29122_CommonData.yaml#/components/responses/429'
        '500':
          $ref: 'TS29122_CommonData.yaml#/components/responses/500'
        '503':
          $ref: 'TS29122_CommonData.yaml#/components/responses/503'
        default:
          $ref: 'TS29122_CommonData.yaml#/components/responses/default'
```

-continued

* Next Change to 3GPP TS 29.122 *

```
/{scsAsId}/subscriptions/{subscriptionId}:
  get:
    summary: read an active subscriptions for the SCS/AS and the subscription Id
    tags:
      - MonitoringEvent API Subscription level GET Operation
    parameters:
      - name: scsAsId
        in: path
        description: Identifier of the SCS/AS
        required: true
        schema:
          type: string
      - name: subscriptionId
        in: path
        description: Identifier of the subscription resource
        required: true
        schema:
          type: string
    responses:
      '200':
        description: OK (Successful get the active subscription)
        content:
          application/json:
            schema:
              $ref: '#/components/schemas/MonitoringEventSubscription'
      '400':
        $ref: 'TS29122_CommonData.yaml#/components/responses/400'
      '401':
        $ref: 'TS29122_CommonData.yaml#/components/responses/401'
      '403':
        $ref: 'TS29122_CommonData.yaml#/components/responses/403'
      '404':
        $ref: 'TS29122_CommonData.yaml#/components/responses/404'
      '406':
        $ref: 'TS29122_CommonData.yaml#/components/responses/406'
      '429':
        $ref: 'TS29122_CommonData.yaml#/components/responses/429'
      '500':
        $ref: 'TS29122_CommonData.yaml#/components/responses/500'
      '503':
        $ref: 'TS29122_CommonData.yaml#/components/responses/503'
      default:
        $ref: 'TS29122_CommonData.yaml#/components/responses/default'
  put:
    summary: Updates/replaces an existing subscription resource
    tags:
      - MonitoringEvent API subscription level PUT Operation
    parameters:
      - name: scsAsId
        in: path
        description: Identifier of the SCS/AS
        required: true
        schema:
          type: string
      - name: subscriptionId
        in: path
        description: Identifier of the subscription resource
        required: true
        schema:
          type: string
    requestBody:
      description: Parameters to update/replace the existing subscription
      required: true
      content:
        application/json:
          schema:
            $ref: '#/components/schemas/MonitoringEventSubscription'
    responses:
      '200':
        description: OK (Successful update of the subscription)
        content:
          application/json:
            schema:
              $ref: '#/components/schemas/MonitoringEventSubscription'
      '400':
        $ref: 'TS29122_CommonData.yaml#/components/responses/400'
      '401':
```

* Next Change to 3GPP TS 29.122 *

```
              $ref: 'TS29122_CommonData.yaml#/components/responses/401'
            '403':
              $ref: 'TS29122_CommonData.yaml#/components/responses/403'
            '404':
              $ref: 'TS29122_CommonData.yaml#/components/responses/404'
            '411':
              $ref: 'TS29122_CommonData.yaml#/components/responses/411'
            '413':
              $ref: 'TS29122_CommonData.yaml#/components/responses/413'
            '415':
              $ref: 'TS29122_CommonData.yaml#/components/responses/415'
            '429':
              $ref: 'TS29122_CommonData.yaml#/components/responses/429'
            '500':
              $ref: 'TS29122_CommonData.yaml#/components/responses/500'
            '503':
              $ref: 'TS29122_CommonData.yaml#/components/responses/503'
            default:
              $ref: 'TS29122_CommonData.yaml#/components/responses/default'
      delete:
        summary: Deletes an already existing monitoring event subscription
        tags:
          - MonitoringEvent API Subscription level DELETE Operation
        parameters:
          - name: scsAsId
            in: path
            description: Identifier of the SCS/AS
            required: true
            schema:
              type: string
          - name: subscriptionId
            in: path
            description: Identifier of the subscription resource
            required: true
            schema:
              type: string
        responses:
          '204':
            description: No Content (Successful deletion of the existing subscription)
          '200':
            description: OK (Successful deletion of the existing subscription)
            content:
              application/json:
                schema:
                  type: array
                  items:
                    $ref: '#/components/schemas/MonitoringEventReport'
                  minItems: 1
                  description: The subscription was terminated successfully, the monitoring event report(s) shall be included if received.
          '400':
            $ref: 'TS29122_CommonData.yaml#/components/responses/400'
          '401':
            $ref: 'TS29122_CommonData.yaml#/components/responses/401'
          '403':
            $ref: 'TS29122_CommonData.yaml#/components/responses/403'
          '404':
            $ref: 'TS29122_CommonData.yaml#/components/responses/404'
          '429':
            $ref: 'TS29122_CommonData.yaml#/components/responses/429'
          '500':
            $ref: 'TS29122_CommonData.yaml#/components/responses/500'
          '503':
            $ref: 'TS29122_CommonData.yaml#/components/responses/503'
          default:
            $ref: 'TS29122_CommonData.yaml#/components/responses/default'
components:
  securitySchemes:
    oAuth2ClientCredentials:
      type: oauth2
      flows:
        clientCredentials:
          tokenUrl: '{tokenUrl}'
          scopes: { }
```

-continued

* Next Change to 3GPP TS 29.122 *

```
schemas:
  MonitoringEventSubscription:
    type: object
    properties:
      self:
        $ref: 'TS29122_CommonData.yaml#/components/schemas/Link'
      supportedFeatures:
        $ref: 'TS29571_CommonData.yaml#/components/schemas/SupportedFeatures'
      mtcProviderId:
        type: string
        description: Identifies the MTC Service Provider and/or MTC Application.
      externalId:
        $ref: 'TS29122_CommonData.yaml#/components/schemas/ExternalId'
      msisdn:
        $ref: 'TS29122_CommonData.yaml#/components/schemas/Msisdn'
      externalGroupId:
        $ref: 'TS29122_CommonData.yaml#/components/schemas/ExternalGroupId'
      addExtGroupId:
        type: array
        items:
          $ref: 'TS29122_CommonData.yaml#/components/schemas/ExternalGroupId'
        minItems: 2
      ipv4Addr:
        $ref: 'TS29122_CommonData.yaml#/components/schemas/Ipv4Addr'
      ipv6Addr:
        $ref: 'TS29122_CommonData.yaml#/components/schemas/Ipv6Addr'
      notificationDestination:
        $ref: 'TS29122_CommonData.yaml#/components/schemas/Link'
      requestTestNotification:
        type: boolean
        description: Set to true by the SCS/AS to request the SCEF to send a test
notification as defined in subclause 5.2.5.3. Set to false or omitted otherwise.
      websockNotifConfig:
        $ref: 'TS29122_CommonData.yaml#/components/schemas/WebsockNotifConfig'
      monitoringType:
        $ref: '#/components/schemas/MonitoringType'
      maximumNumberOfReports:
        type: integer
        minimum: 1
        description: Identifies the maximum number of event reports to be generated by the
HSS, MME/SGSN as specified in subclause 5.6.0 of 3GPP TS 23.682 [2].
      monitorExpireTime:
        $ref: 'TS29122_CommonData.yaml#/components/schemas/DateTime'
      groupReportGuardTime:
        $ref: 'TS29122_CommonData.yaml#/components/schemas/DurationSec'
      maximumDetectionTime:
        $ref: 'TS29122_CommonData.yaml#/components/schemas/DurationSec'
      reachabilityType:
        $ref: '#/components/schemas/ReachabilityType'
      maximumLatency:
        $ref: 'TS29122_CommonData.yaml#/components/schemas/DurationSec'
      maximumResponseTime:
        $ref: 'TS29122_CommonData.yaml#/components/schemas/DurationSec'
      suggestedNumberOfDlPackets:
        type: integer
        minimum: 0
        description: If "monitoringType" is "UE_REACHABILITY", this parameter may be
included to identify the number of packets that the serving gateway shall buffer in case that
the UE is not reachable.
      idleStatusIndication:
        type: boolean
        description: If "monitoringType" is set to "UE_REACHABILITY" or
"AVAILABILITY_AFTER_DDN_FAILURE", this parameter may be included to indicate the notification
of when a UE, for which PSM is enabled, transitions into idle mode. - "true" indicate
enabling of notification - "false" indicate no need to notify Default "false".
      locationType:
        $ref: '#/components/schemas/LocationType'
      accuracy:
        $ref: '#/components/schemas/Accuracy'
      minimumReportInterval:
        $ref: 'TS29122_CommonData.yaml#/components/schemas/DurationSec'
      associationType:
        $ref: '#/components/schemas/AssociationType'
      plmnIndication:
        type: boolean
        description: If "monitoringType" is "ROAMING_STATUS", this parameter may be included
to indicate the notification of UE's Serving PLMN ID. - "true" The value shall be used to
```

| *** Next Change to 3GPP TS 29.122 *** |
|---|

```
indicate enabling of notification; - "false" The value shall be used to indicate disabling of
notification. Default "false".
        locationArea:
            $ref: 'TS29122_CommonData.yaml#/components/schemas/LocationArea'
        locationArea5G:
            $ref: 'TS29122_CommonData.yaml#/components/schemas/LocationArea5G'
        dddTraDes:
            $ref: 'TS29508_Nsmf_EventExposure.yaml#/components/schemas/DddTrafficDescriptor'
        dddStati:
            type: array
            items:
                $ref: 'TS29508_Nsmf_EventExposure.yaml#/components/schemas/DddStatus'
        apiNames:
            type: array
            items:
                type: string
            minItems: 1
        monitoringEventReport:
            $ref: '#/components/schemas/MonitoringEventReport'
      required:
        - notificationDestination
        - monitoringType
      anyOf:
        - required: [maximumNumberOfReports]
        - required: [monitorExpireTime]
    MonitoringNotification:
      type: object
      properties:
        subscription:
            $ref: 'TS29122_CommonData.yaml#/components/schemas/Link'
        configResults:
            type: array
            items:
                $ref: 'TS29122_CommonData.yaml#/components/schemas/ConfigResult'
            minItems: 1
            description: Each element identifies a notification of grouping configuration
result.
        monitoringEventReports:
            type: array
            items:
                $ref: '#/components/schemas/MonitoringEventReport'
            minItems: 1
            description: Monitoring event reports.
        cancelInd:
            type: boolean
            description: Indicates whether to request to cancel the corresponding monitoring
subscription. Set to false or omitted otherwise.
        appliedParam:
            $ref: '#/components/schemas/AppliedParameterConfiguration'
      required:
        - subscription
    MonitoringEventReport:
      type: object
      properties:
        imeiChange:
            $ref: '#/components/schemas/AssociationType'
        externalId:
            $ref: 'TS29122_CommonData.yaml#/components/schemas/ExternalId'
        idleStatusInfo:
            $ref: '#/components/schemas/IdleStatusInfo'
        locationInfo:
            $ref: '#/components/schemas/LocationInfo'
        lossOfConnectReason:
            type: integer
            description: If "monitoringType" is "LOSS_OF_CONNECTIVITY", this parameter shall be
included if available to identify the reason why loss of connectivity is reported. Refer to
3GPP TS 29.336 [11] Subclause 8.4.58.
        maxUEAvailabilityTime:
            $ref: 'TS29122_CommonData.yaml#/components/schemas/DateTime'
        msisdn:
            $ref: 'TS29122_CommonData.yaml#/components/schemas/Msisdn'
        monitoringType:
            $ref: '#/components/schemas/MonitoringType'
        uePerLocationReport:
            $ref: '#/components/schemas/UePerLocationReport'
        plmnId:
            $ref: 'TS29122_CommonData.yaml#/components/schemas/PlmnId'
```

* Next Change to 3GPP TS 29.122 *

```
          reachabilityType:
            $ref: '#/components/schemas/ReachabilityType'
          roamingStatus:
            type: boolean
            description: If "monitoringType" is "ROAMING_STATUS", this parameter shall be set to
"true" if the UE is on roaming status. Set to false or omitted otherwise.
          failureCause:
            $ref: '#/components/schemas/FailureCause'
          eventTime:
            $ref: 'TS29122_CommonData.yaml#/components/schemas/DateTime'
          pdnConnInfo:
            $ref: '#/components/schemas/PdnConnectionInformation'
          dddStatus:
            $ref: 'TS29508_Nsmf_EventExposure.yaml#/components/schemas/DddStatus'
          maxWaitTime:
            $ref: 'TS29122_CommonData.yaml#/components/schemas/DateTime'
        required:
          - monitoringType
      IdleStatusInfo:
        type: object
        properties:
          activeTime:
            $ref: 'TS29122_CommonData.yaml#/components/schemas/DurationSec'
          edrxCycleLength:
            format: float
            type: number
            minimum: 0
          suggestedNumberOfDlPackets:
            type: integer
            minimum: 0
            description: Identifies the number of packets shall be buffered in the serving
gateway. It shall be present if the idle status indication is requested by the SCS/AS with
"idleStatusIndication" in the "monitoringEventSubscription" sets to "true".
          idleStatusTimestamp:
            $ref: 'TS29122_CommonData.yaml#/components/schemas/DateTime'
          periodicAUTimer:
            $ref: 'TS29122_CommonData.yaml#/components/schemas/DurationSec'
      UePerLocationReport:
        type: object
        properties:
          ueCount:
            type: integer
            minimum: 0
            description: Identifies the number of UEs.
          externalIds:
            type: array
            items:
              $ref: 'TS29122_CommonData.yaml#/components/schemas/ExternalId'
            minItems: 1
            description: Each element uniquely identifies a user.
          msisdns:
            type: array
            items:
              $ref: 'TS29122_CommonData.yaml#/components/schemas/Msisdn'
            minItems: 1
            description: Each element identifies the MS internal PSTN/ISDN number allocated for
a UE.
        required:
          - ueCount
      LocationInfo:
        type: object
        properties:
          ageOfLocationInfo:
            $ref: 'TS29122_CommonData.yaml#/components/schemas/DurationMin'
          cellId:
            type: string
            description: Indicates the Cell Global Identification of the user which identifies
the cell the UE is registered.
          enodeBId:
            type: string
            description: Indicates the eNodeB in which the UE is currently located.
          routingAreaId:
            type: string
            description: Identifies the Routing Area Identity of the user where the UE is
located.
          trackingAreaId:
            type: string
```

|     |
| --- |
| *** Next Change to 3GPP TS 29.122 *** |

```
          description: Identifies the Tracking Area Identity of the user where the UE is
located.
        plmnId:
          type: string
          description: Identifies the PLMN Identity of the user where the UE is located.
        twanId:
          type: string
          description: Identifies the TWAN Identity of the user where the UE is located.
        geographicArea:
          $ref: 'TS29572_Nlmf_Location.yaml#/components/schemas/GeographicArea'
    FailureCause:
      type: object
      properties:
        bssgpCause:
          type: integer
          description: Identifies a non-transparent copy of the BSSGP cause code. Refer to
3GPP TS 29.128 [12].
        causeType:
          type: integer
          description: Identify the type of the S1AP-Cause. Refer to 3GPP TS 29.128 [12].
        gmmCause:
          type: integer
          description: Identifies a non-transparent copy of the GMM cause code. Refer to
3GPP TS 29.128 [12].
        ranapCause:
          type: integer
          description: Identifies a non-transparent copy of the RANAP cause code. Refer to
3GPP TS 29.128 [12].
        ranNasCause:
          type: string
          description: Indicates RAN and/or NAS release cause code information, TWAN release
cause code information or untrusted WLAN release cause code information. Refer to
3GPP TS 29.214 [10].
        s1ApCause:
          type: integer
          description: Identifies a non-transparent copy of the S1AP cause code. Refer to
3GPP TS 29.128 [12].
        smCause:
          type: integer
          description: Identifies a non-transparent copy of the SM cause code. Refer to
3GPP TS 29.128 [12].
    PdnConnectionInformation:
      type: object
      properties:
        status:
          $ref: '#/components/schemas/PdnConnectionStatus'
        apn:
          type: string
          description: Identify the APN, it is depending on the SCEF local configuration
whether or not this attribute is sent to the SCS/AS.
        pdnType:
          $ref: '#/components/schemas/PdnType'
        interfaceInd:
          $ref: '#/components/schemas/InterfaceIndication'
        ipv4Addr:
          $ref: 'TS29122_CommonData.yaml#/components/schemas/Ipv4Addr'
        ipv6Addr:
          $ref: 'TS29122_CommonData.yaml#/components/schemas/Ipv6Addr'
      required:
        - status
        - pdnType
      anyOf:
        - required: [ipv4Addr]
        - required: [ipv6Addr]
    AppliedParameterConfiguration:
      type: object
      properties:
        externalIds:
          type: array
          items:
            $ref: 'TS29122_CommonData.yaml#/components/schemas/ExternalId'
          minItems: 1
          description: Each element uniquely identifies a user.
        msisdns:
          type: array
          items:
            $ref: 'TS29122_CommonData.yaml#/components/schemas/Msisdn'
```

* Next Change to 3GPP TS 29.122 *

```
            minItems: 1
            description: Each element identifies the MS internal PSTN/ISDN number allocated for
a UE.
          maximumLatency:
            $ref: 'TS29122_CommonData.yaml#/components/schemas/DurationSec'
          maximumResponseTime:
            $ref: 'TS29122_CommonData.yaml#/components/schemas/DurationSec'
          maximumDetectionTime:
            $ref: 'TS29122_CommonData.yaml#/components/schemas/DurationSec'
    MonitoringType:
      anyOf:
        - type: string
          enum:
            - LOSS_OF_CONNECTIVITY
            - UE_REACHABILITY
            - LOCATION_REPORTING
            - CHANGE_OF_IMSI_IMEI_ASSOCIATION
            - ROAMING_STATUS
            - COMMUNICATION_FAILURE
            - AVAILABILITY_AFTER_DDN_FAILURE
            - NUMBER_OF_UES_IN_AN_AREA
            - PDN_CONNECTIVITY_STATUS
            - DOWNLINK_DATA_DELIVERY_STATUS
        - type: string
          description: >
            This string provides forward-compatibility with future
            extensions to the enumeration but is not used to encode
            content defined in the present version of this API.
      description: >
        Possible values are
        - LOSS_OF_CONNECTIVITY: The SCS/AS requests to be notified when the 3GPP network
detects that the UE is no longer reachable for signalling or user plane communication
        - UE_REACHABILITY: The SCS/AS requests to be notified when the UE becomes reachable
for sending either SMS or downlink data to the UE
        - LOCATION_REPORTING: The SCS/AS requests to be notified of the current location or
the last known location of the UE
        - CHANGE_OF_IMSI_IMEI_ASSOCIATION: The SCS/AS requests to be notified when the
association of an ME (IMEI (SV)) that uses a specific subscription (IMSI) is changed
        - ROAMING_STATUS: The SCS/AS queries the UE's current roaming status and requests to
get notified when the status changes
        - COMMUNICATION_FAILURE: The SCS/AS requests to be notified of communication failure
events
        - AVAILABILITY_AFTER_DDN_FAILURE: The SCS/AS requests to be notified when the UE has
become available after a DDN failure
        - NUMBER_OF_UES_IN_AN_AREA: The SCS/AS requests to be notified the number of UEs in a
given geographic area
        - PDN_CONNECTIVITY_STATUS: The SCS/AS requests to be notified when the 3GPP network
detects that the UE's PDN connection is set up or torn down
        - DOWNLINK_DATA_DELIVERY_STATUS: The AF requests to be notified when the 3GPP network
detects that the downlink data delivery status is changed.
    ReachabilityType:
      anyOf:
        - type: string
          enum:
            - SMS
            - DATA
        - type: string
          description: >
            This string provides forward-compatibility with future
            extensions to the enumeration but is not used to encode
            content defined in the present version of this API.
      description: >
        Possible values are
        - SMS : The SCS/AS requests to be notified when the UE becomes reachable for sending
SMS to the UE
        - DATA: The SCS/AS requests to be notified when the UE becomes reachable for sending
downlink data to the UE
    LocationType:
      anyOf:
        - type: string
          enum:
            - CURRENT LOCATION
            - LAST KNOWN LOCATION
```

* Next Change to 3GPP TS 29.122 *

```
      - type: string
         description: >
            This string provides forward-compatibility with future
            extensions to the enumeration but is not used to encode
            content defined in the present version of this API.
      description: >
         Possible values are
         - CURRENT_LOCATION: The SCS/AS requests to be notified for current location
         - LAST_KNOWN_LOCATION: The SCS/AS requests to be notified for last known location
   AssociationType:
      anyOf:
      - type: string
         enum:
            - IMEI
            - IMEISV
      - type: string
         description: >
            This string provides forward-compatibility with future
            extensions to the enumeration but is not used to encode
            content defined in the present version of this API.
      description: >
         Possible values are
         - IMEI: The value shall be used when the change of IMSI-IMEI association shall be
detected
         - IMEISV: The value shall be used when the change of IMSI-IMEISV association shall be
detected
   Accuracy:
      anyOf:
      - type: string
         enum:
            - CGI_ECGI
            - ENODEB
            - TA_RA
            - PLMN
            - TWAN_ID
            - GEO_AREA
      - type: string
         description: >
            This string provides forward-compatibility with future
            extensions to the enumeration but is not used to encode
            content defined in the present version of this API.
      description: >
         Possible values are
         - CGI_ECGI: The SCS/AS requests to be notified at cell level location accuracy.
         - ENODEB: The SCS/AS requests to be notified at eNodeB level location accuracy.
         - TA_RA: The SCS/AS requests to be notified at TA/RA level location accuracy.
         - PLMN: The SCS/AS requests to be notified at PLMN level location accuracy.
         - TWAN_ID: The SCS/AS requests to be notified at TWAN identifier level location
accuracy.
         - GEO_AREA: The SCS/AS requests to be notified of the geographical area accuracy.
   PdnConnectionStatus:
      anyOf:
      - type: string
         enum:
            - CREATED
            - RELEASED
      - type: string
         description: >
            This string provides forward-compatibility with future
            extensions to the enumeration but is not used to encode
            content defined in the present version of this API.
      description: >
         Possible values are
         - CREATED: The PDN connection is created.
         - RELEASED: The PDN connection is released.
   PdnType:
      anyOf:
      - type: string
         enum:
            - IP
            - NON_IP
      - type: string
         description: >
            This string provides forward-compatibility with future
            extensions to the enumeration but is not used to encode
            content defined in the present version of this API.
```

* Next Change to 3GPP TS 29.122 *

```
            description: >
              Possible values are
              - IP: PDN connection of IP type.
              - NON_IP: PDN connection of non-IP type.
        InterfaceIndication:
          anyOf:
            - type: string
              enum:
                - EXPOSURE FUNCTION
                - PDN_GATEWAY
            - type: string
              description: >
                This string provides forward-compatibility with future
                extensions to the enumeration but is not used to encode
                content defined in the present version of this API.
          description: >
            Possible values are
            - EXPOSURE_FUNCTION: SCEF is used for the PDN connection towards the SCS/AS.
            - PDN_GATEWAY: PDN gateway is used for the PDN connection towards the SCS/AS.
```
* End of Changes to 3GPP TS 29.122 *

FIG. 5

Figure 5:
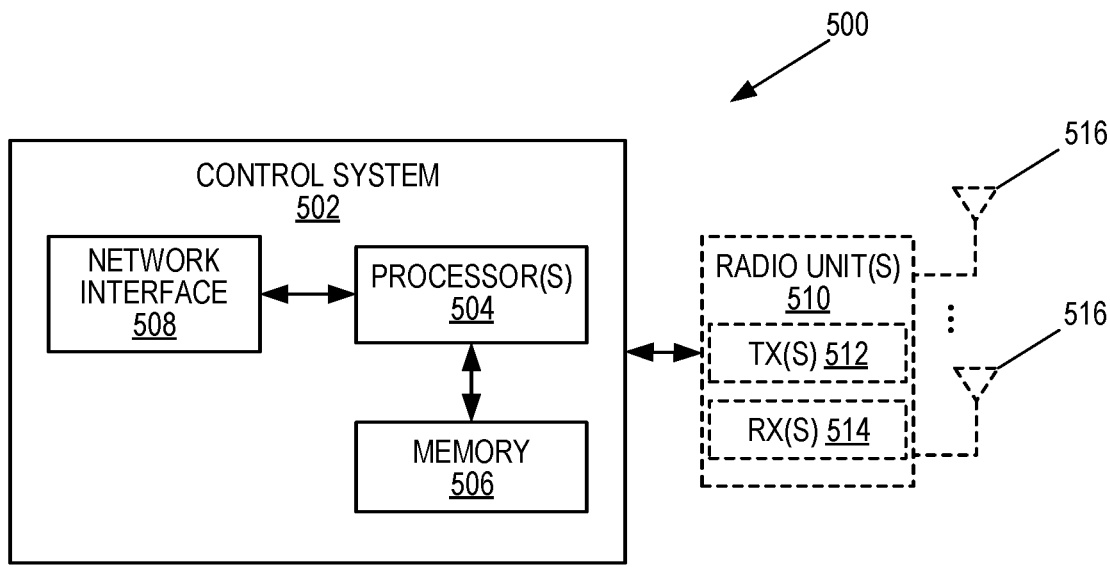
FIG. 5 is a schematic block diagram of a network node according to some embodiments of the present disclosure.

FIG. 5 is a schematic block diagram of a network node 500 according to some embodiments of the present disclosure. Optional features are represented by dashed boxes. The network node 500 may be, for example, a core network node or a radio access network node. The network node 500 may be, for example, a base station 102 or 106 or a network node that implements all or part of the functionality of the base station 102 or gNB described herein. As illustrated, the network node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the network node 500 may include one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a network node 500 as described herein. In some embodiments, the function(s) are implemented in software that is stored, e.g., in the memory 506 and executed by the one or more processors 504.

FIG. 6

Figure 6:
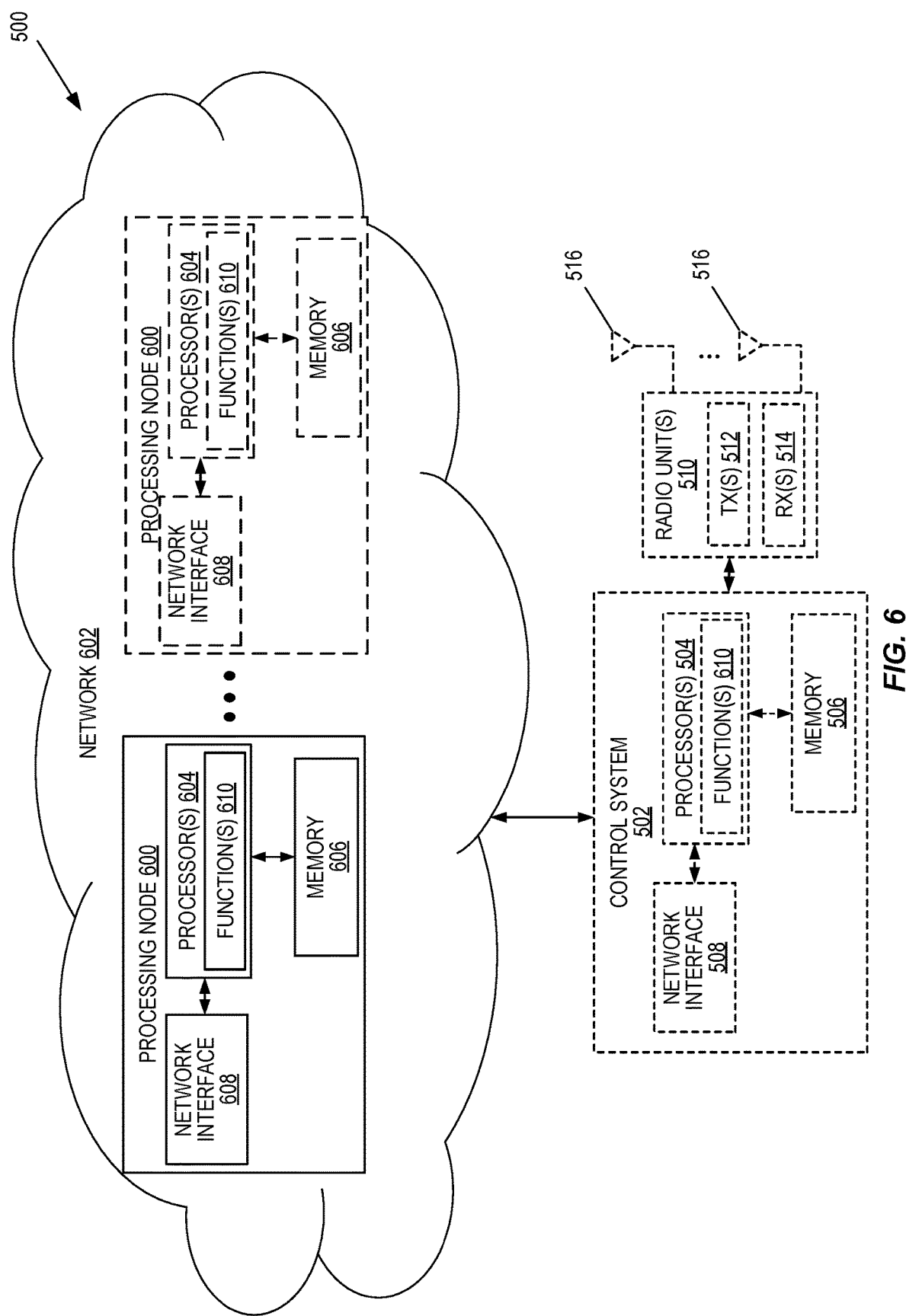
FIG. 6 is a schematic block diagram that illustrates a virtualized embodiment of the radio access node of FIG. 5 according to some embodiments of the present disclosure.

FIG. 6 is a schematic block diagram that illustrates a virtualized embodiment of the network node 500 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the network node 500 in which at least a portion of the functionality of the network node 500 is implemented as a virtual component(s) (e.g., via a virtual machine(s) executing on a physical processing node(s) in a network(s)). As illustrated, in this example, the network node 500 may include the control system 502 and/or the one or more radio units 510, as described above. The control system 502 may be connected to the radio unit(s) 510 via, for example, an optical cable or the like. The network node 500 includes one or more processing nodes 600 coupled to or included as part of a network(s) 602. If present, the control system 502 or the radio unit(s) are connected to the processing node(s) 600 via the network 602. Each processing node 600 includes one or more processors 604 (e.g., CPUs, ASICs, FPGAs, and/or the like), memory 606, and a network interface 608.

In this example, functions 610 of the network node 500 described herein are implemented at the one or more processing nodes 600 or distributed across the one or more processing nodes 600 and the control system 502 and/or the radio unit(s) 510 in any desired manner. In some particular embodiments, some or all of the functions 610 of the network node 500 described herein are implemented as virtual components executed by one or more virtual machines implemented in a virtual environment(s) hosted by the processing node(s) 600. As will be appreciated by one of ordinary skill in the art, additional signaling or communication between the processing node(s) 600 and the control system 502 is used in order to carry out at least some of the desired functions 610. Notably, in some embodiments, the control system 502 may not be included, in which case the radio unit(s) 510 communicate directly with the processing node(s) 600 via an appropriate network interface(s).

In some embodiments, a computer program including instructions which, when executed by at least one processor, causes the at least one processor to carry out the functionality of network node 500 or a node (e.g., a processing node 600) implementing one or more of the functions 610 of the network node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 7

Figure 7:
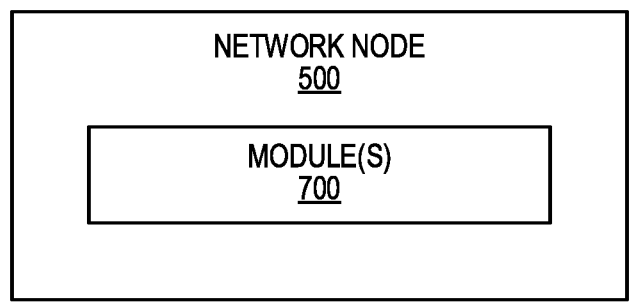
FIG. 7 is a schematic block diagram of the radio access node of FIG. 5 according to some other embodiments of the present disclosure.

FIG. 7 is a schematic block diagram of the network node 500 according to some other embodiments of the present disclosure. The network node 500 includes one or more modules 700, each of which is implemented in software. The module(s) 700 provide the functionality of the network node 500 described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

FIG. 8

Figure 8:
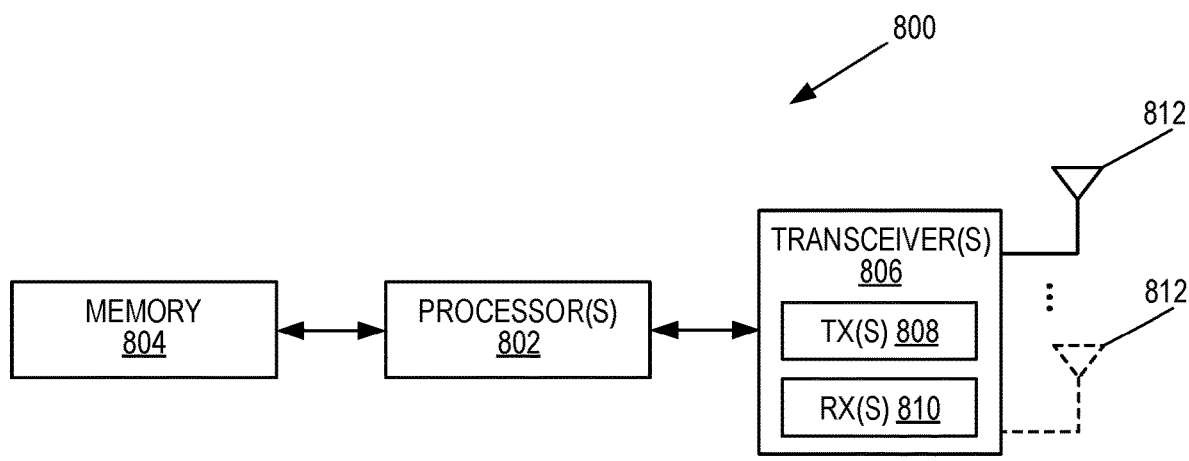
FIG. 8 is a schematic block diagram of a User Equipment device (UE) according to some embodiments of the present disclosure.

FIG. 8 is a schematic block diagram of a wireless communication device 800 according to some embodiments of the present disclosure. As illustrated, the wireless communication device 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the wireless communication device 800 described above may be fully or partially implemented in software that is, e.g., stored in the memory 804 and executed by the processor(s) 802. Note that the wireless communication device 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the wireless communication device 800 and/or allowing output of information from the wireless communication device 800), a power supply (e.g., a battery and associated power circuitry), etc.

In some embodiments, a computer program including instructions which, when executed by at least one processor, causes the at least one processor to carry out the functionality of the wireless communication device 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 9

Figure 9:
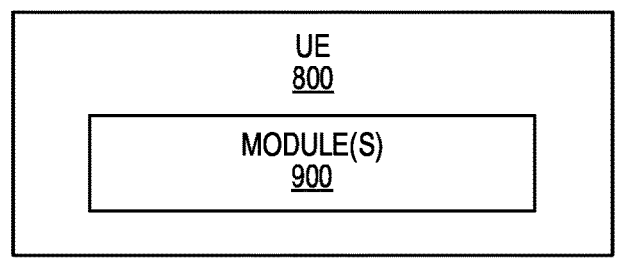
FIG. 9 is a schematic block diagram of the UE of FIG. 8 according to some other embodiments of the present disclosure.

FIG. 9 is a schematic block diagram of the wireless communication device 800 according to some other embodiments of the present disclosure. The wireless communication device 800 includes one or more modules 900, each of which is implemented in software. The module(s) 900 provide the functionality of the wireless communication device 800 described herein.

Some Embodiments

Some embodiments described above may be summarized in the following manner:

1. A method for reporting Application Programming Interface, API, capability change according to an API filter, the method comprising:
at a first node within a telecommunication core network:
  receiving (400), from a requesting entity, a request to be notified of an API capability change related to an identified wireless device, the request identifying a set of one or more APIs to be monitored;
  subscribing (402, 404) to receive notifications of a core network type change for the identified wireless device;
  receiving (414) a notification that the identified wireless device has changed from a first type of core network to a second type of core network;
  determining (418) an API capability change from the first type of core network to the second type of core network for the identified set of one or more APIs to be monitored; and
  reporting (420), to the requesting entity, the API capability change for the identified set of one or more APIs to be monitored and not reporting the API capability change for APIs not in the identified set.

2. The method of embodiment 1 wherein the first node comprises a node for exposing services and capabilities of a telecommunication core network to entities outside of the telecommunication core network.

3. The method of embodiment 2 wherein the first node comprises a Service Capability Exposure Function, SCEF, a Network Exposure Function, NEF, or a combined SCEF+NEF.

4. The method of any one of embodiment 1-3 wherein the requesting entity comprises an Application Function, AF, a Service Capability Server, SCS, and/or an Application Server, AS.

5. The method of any one of embodiment 1-4 wherein receiving (400) the request to be notified of an API capability change related to an identified wireless device comprises receiving a monitoring request.

6. The method of any one of embodiment 1-5 wherein subscribing (402, 404) to receive notifications of a core network type change for the identified wireless device comprises sending a subscribe request to a node comprising a Home Subscriber Server, HSS, a Unified Data Management function, UDM, or a combined HSS+UDM.

7. The method of any one of embodiment 1-6 wherein subscribing (402, 404) to receive notifications of a core network type change for the identified wireless device comprises sending a Nudm_EventExposure_Subscribe Request.

8. The method of any one of embodiment 1-7 wherein receiving (414) a notification that the identified wireless device has changed from a first type of core network to a second type of core network comprises receiving a Nudm_EventExposure_Notify Response.

9. The method of any one of embodiment 1-8 wherein reporting (420) the API capability change comprises sending a monitoring indication request.

10. A method for reporting Application Programming Interface, API, capability change according to an API filter, the method comprising:
at a requesting entity:
  sending (400), to a first node within a telecommunication core network, a request to be notified of an API capability change related to an identified wireless device, the request identifying a set of one or more APIs to be monitored; and
  receiving (420), from the first node, a notification of an API capability change related to the identified wireless device, the notification including the API capability change for the identified set of one or more APIs to be monitored and not including an API capability change for APIs not in the identified set.

11. The method of embodiment 10 wherein sending (400) the request to the first node comprises sending the request to a node for exposing services and capabilities of a telecommunication core network to entities outside of the telecommunication core network.

12. The method of embodiment 11 wherein the first node comprises a Service Capability Exposure Function, SCEF, a Network Exposure Function, NEF, or a combined SCEF+NEF.

13. The method of any one of embodiment 10-12 wherein the requesting entity comprises an Application Function, AF, a Service Capability Server, SCS, and/or an Application Server, AS.

14. The method of any one of embodiment 10-13 wherein sending (400) the request to be notified of an API capability change related to an identified wireless device comprises sending a monitoring request.

15. The method of any one of embodiment 10-14 wherein receiving (420) the notification of an API capability change related to the identified wireless device comprises receiving a monitoring indication request.

16. A network node (500) for reporting Application Programming Interface, API, capability change according to an API filter, the network node comprising:
one or more processors (504); and
memory (506) storing instructions executable by the one or more processors, whereby the network node is operable to:
receive (400), from a requesting entity, a request to be notified of an API capability change related to an identified wireless device, the request identifying a set of one or more APIs to be monitored;
subscribe (402, 404) to receive notifications of a core network type change for the identified wireless device;
receive (414) a notification that the identified wireless device has changed from a first type of core network to a second type of core network;
determine (418) an API capability change from the first type of core network to the second type of core network for the identified set of one or more APIs to be monitored; and
report (420), to the requesting entity, the API capability change for the identified set of one or more APIs to be monitored and not reporting the API capability change for APIs not in the identified set.

17. The network node of embodiment 16 comprising a node for exposing services and capabilities of a telecommunication core network to entities outside of the telecommunication core network.

18. The network node of embodiment 17 comprising a Service Capability Exposure Function, SCEF, a Network Exposure Function, NEF, or a combined SCEF+NEF.

19. The network node of any one of embodiment 16-18 wherein receiving (400) the request to be notified of an API capability change related to an identified wireless device comprises receiving a monitoring request.

20. The network node of any one of embodiment 16-19 wherein subscribing (402, 404) to receive notifications of a core network type change for the identified wireless device comprises sending a subscribe request to a node comprising a Home Subscriber Server, HSS, a Unified Data Management function, UDM, or a combined HSS+UDM.

21. The network node of any one of embodiment 16-20 wherein subscribing (402, 404) to receive notifications of a core network type change for the identified wireless device comprises sending a Nudm_EventExposure_Subscribe Request.

22. The network node of any one of embodiment 16-21 wherein receiving (414) a notification that the identified wireless device has changed from a first type of core network to a second type of core network comprises receiving a Nudm_EventExposure_Notify Response.

23. The network node of any one of embodiment 16-22 wherein reporting (420) the API capability change comprises sending a monitoring indication request.

24. A network node (500) configured for reporting Application Programming Interface, API, capability change according to an API filter, the network node comprising processing circuitry (504) adapted to:
receive (400), from a requesting entity, a request to be notified of an API capability change related to an identified wireless device, the request identifying a set of one or more APIs to be monitored;
subscribe (402, 404) to receive notifications of a core network type change for the identified wireless device;
receive (414) a notification that the identified wireless device has changed from a first type of core network to a second type of core network;
determine (418) an API capability change from the first type of core network to the second type of core network for the identified set of one or more APIs to be monitored; and
report (420), to the requesting entity, the API capability change for the identified set of one or more APIs to be monitored and not reporting the API capability change for APIs not in the identified set.

25. The network node of embodiment 24 comprising a node for exposing services and capabilities of a telecommunication core network to entities outside of the telecommunication core network.

26. The network node of embodiment 25 comprising a Service Capability Exposure Function, SCEF, a Network Exposure Function, NEF, or a combined SCEF+NEF.

27. The network node of any one of embodiment 24-26 wherein receiving (400) the request to be notified of an API capability change related to an identified wireless device comprises receiving a monitoring request.

28. The network node of any one of embodiment 24-27 wherein subscribing (402, 404) to receive notifications of a core network type change for the identified wireless device comprises sending a subscribe request to a node comprising a Home Subscriber Server, HSS, a Unified Data Management function, UDM, or a combined HSS+UDM.

29. The network node of any one of embodiment 24-28 wherein subscribing (402, 404) to receive notifications of a core network type change for the identified wireless device comprises sending a Nudm_EventExposure_Subscribe Request.

30. The network node of any one of embodiment 24-29 wherein receiving (414) a notification that the identified wireless device has changed from a first type of core network to a second type of core network comprises receiving a Nudm_EventExposure_Notify Response.

31. The network node of any one of embodiment 24-30 wherein reporting (420) the API capability change comprises sending a monitoring indication request.

32. A network node (500) for reporting Application Programming Interface, API, capability change according to an API filter, the network node comprising modules (700) adapted to:
receive (400), from a requesting entity, a request to be notified of an API capability change related to an identified wireless device, the request identifying a set of one or more APIs to be monitored;

subscribe (402, 404) to receive notifications of a core network type change for the identified wireless device;

receive (414) a notification that the identified wireless device has changed from a first type of core network to a second type of core network;

determine (418) an API capability change from the first type of core network to the second type of core network for the identified set of one or more APIs to be monitored; and report (420), to the requesting entity, the API capability change for the identified set of one or more APIs to be monitored and not reporting the API capability change for APIs not in the identified set.

33. The network node of embodiment 32 comprising a node for exposing services and capabilities of a telecommunication core network to entities outside of the telecommunication core network.

34. The network node of embodiment 33 comprising a Service Capability Exposure Function, SCEF, a Network Exposure Function, NEF, or a combined SCEF+NEF.

35. The network node of any one of embodiment 32-34 wherein receiving (400) the request to be notified of an API capability change related to an identified wireless device comprises receiving a monitoring request.

36. The network node of any one of embodiment 32-35 wherein subscribing (402, 404) to receive notifications of a core network type change for the identified wireless device comprises sending a subscribe request to a node comprising a Home Subscriber Server, HSS, a Unified Data Management function, UDM, or a combined HSS+UDM.

37. The network node of any one of embodiment 32-36 wherein subscribing (402, 404) to receive notifications of a core network type change for the identified wireless device comprises sending a Nudm_EventExposure_Subscribe Request.

38. The network node of any one of embodiment 32-37 wherein receiving (414) a notification that the identified wireless device has changed from a first type of core network to a second type of core network comprises receiving a Nudm_EventExposure_Notify Response.

39. The network node of any one of embodiment 32-38 wherein reporting (420) the API capability change comprises sending a monitoring indication request.

40. A network node (500) for reporting Application Programming Interface, API, capability change according to an API filter, the network node comprising:

one or more processors (504); and memory (506) storing instructions executable by the one or more processors, whereby the network node is operable to:

send (400), to a first node within a telecommunication core network, a request to be notified of an API capability change related to an identified wireless device, the request identifying a set of one or more APIs to be monitored; and receive (420), from the first node, a notification of an API capability change related to the identified wireless device, the notification including the API capability change for the identified set of one or more APIs to be monitored and not including an API capability change for APIs not in the identified set.

41. The network node of embodiment 40 wherein sending (400) the request to the first node comprises sending the request to a node for exposing services and capabilities of a telecommunication core network to entities outside of the telecommunication core network.

42. The network node of embodiment 41 wherein the first node comprises a Service Capability Exposure Function, SCEF, a Network Exposure Function, NEF, or a combined SCEF+NEF.

43. The network node of any one of embodiment 40-42 wherein the requesting entity comprises an Application Function, AF, a Service Capability Server, SCS, and/or an Application Server, AS.

44. The network node of any one of embodiment 40-43 wherein sending (400) the request to be notified of an API capability change related to an identified wireless device comprises sending a monitoring request.

45. The network node of any one of embodiment 40-44 wherein receiving (420) the notification of an API capability change related to the identified wireless device comprises receiving a monitoring indication request.

46. A network node (500) configured for reporting Application Programming Interface, API, capability change according to an API filter, the network node comprising processing circuitry (504) adapted to:

send (400), to a first node within a telecommunication core network, a request to be notified of an API capability change related to an identified wireless device, the request identifying a set of one or more APIs to be monitored; and receive (420), from the first node, a notification of an API capability change related to the identified wireless device, the notification including the API capability change for the identified set of one or more APIs to be monitored and not including an API capability change for APIs not in the identified set.

47. The network node of embodiment 46 wherein sending (400) the request to the first node comprises sending the request to a node for exposing services and capabilities of a telecommunication core network to entities outside of the telecommunication core network.

48. The network node of embodiment 47 wherein the first node comprises a Service Capability Exposure Function, SCEF, a Network Exposure Function, NEF, or a combined SCEF+NEF.

49. The network node of any one of embodiment 46-48 wherein the requesting entity comprises an Application Function, AF, a Service Capability Server, SCS, and/or an Application Server, AS.

50. The network node of any one of embodiment 46-49 wherein sending (400) the request to be notified of an API capability change related to an identified wireless device comprises sending a monitoring request.

51. The network node of any one of embodiment 46-50 wherein receiving (420) the notification of an API capability change related to the identified wireless device comprises receiving a monitoring indication request.

52. A network node (500) for reporting Application Programming Interface, API, capability change according to an API filter, the network node comprising modules (700) adapted to:

send (400), to a first node within a telecommunication core network, a request to be notified of an API capability change related to an identified wireless device, the request identifying a set of one or more APIs to be monitored; and receive (420), from the first node, a notification of an API capability change related to the identified wireless device, the notification including the API capability change for the identified set of one or more APIs to be monitored and not including an API capability change for APIs not in the identified set.

53. The network node of embodiment 52 wherein sending (400) the request to the first node comprises sending the request to a node for exposing services and capabilities of a telecommunication core network to entities outside of the telecommunication core network.

54. The network node of embodiment 53 wherein the first node comprises a Service Capability Exposure Function, SCEF, a Network Exposure Function, NEF, or a combined SCEF+NEF.

55. The network node of any one of embodiment 52-54 wherein the requesting entity comprises an Application Function, AF, a Service Capability Server, SCS, and/or an Application Server, AS.

56. The network node of any one of embodiment 52-55 wherein sending (400) the request to be notified of an API capability change related to an identified wireless device comprises sending a monitoring request.

57. The network node of any one of embodiment 52-56 wherein receiving (420) the notification of an API capability change related to the identified wireless device comprises receiving a monitoring indication request.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
5GC Fifth Generation Core network
5GS Fifth Generation System
AF Application Function
AMF Core Access and Mobility Management Function
AN Access Network
AP Access Point
API Application Programming Interface
AS Application Server
AUSF Authentication Server Function
CN Core Network
DN Data Network
DSP Digital Signal Processor
eNB Enhanced or Evolved Node B
EPC Evolved Packet Core
EPS Evolved Packet System
gNB New Radio Base Station
GPRS General Packet Radio Service
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PCF Policy Control Function
P-GW Packet Data Network Gateway
QoS Quality of Service
RAN Radio Access Network
SCEF Service Capability Exposure Function
SCS Service Capability Server
SGSN Serving General Packet Radio Service Support Node
SMF Session Management Function
TS Technical Specification
UDM Unified Data Management
UE User Equipment Those skilled in the art will recognize improvements and modifications to the embodiments of the present disclosure. All such improvements and modifications are considered within the scope of the concepts disclosed herein.

What is claimed is:

1. A method for reporting Application Programming Interface (API) capability change according to an API filter, the method comprising:
   at a first node within a telecommunication core network, which first node comprises a combined Service Capability Exposure Function (SCEF) and Network Exposure Function (NEF):
   receiving, from a requesting entity that comprises an Application Function (AF), a monitoring request to be notified of an API capability change related to an identified wireless device associated with a service API, the monitoring request identifying a subset of one or more APIs in which the AF is interested to have monitored;
   subscribing to receive notifications of a core network type change for the identified wireless device;
   receiving a notification that the identified wireless device has changed from a first type of core network to a second type of core network;
   determining an API capability change from the first type of core network to the second type of core network for the identified subset of one or more APIs in which the AF is interested and filtering out all but the APIs in which the AF is interested; and
   reporting, to the requesting entity, the API capability change for the identified subset of one or more APIs in which the AF is interested and not reporting the API capability change for other APIs not in the identified subset.

2. The method of claim 1 wherein subscribing to receive notifications of a core network type change for the identified wireless device comprises sending a subscribe request to a node comprising a Home Subscriber Server (HSS), a Unified Data Management function (UDM), or a combined HSS+UDM.

3. The method of claim 1 wherein subscribing to receive notifications of a core network type change for the identified wireless device comprises sending a Nudm_EventExposure_Subscribe Request.

4. The method of claim 1 wherein receiving a notification that the identified wireless device has changed from a first type of core network to a second type of core network comprises receiving a Nudm_EventExposure_Notify Response.

5. The method of claim 1 wherein reporting the API capability change comprises sending a monitoring indication request.

6. A network node comprising a combined Service Capability Exposure Function (SCEF), and Network Exposure Function (NEF), for reporting Application Programming Interface (API), capability change according to an API filter, the network node comprising:
one or more processors; and
memory storing instructions executable by the one or more processors, whereby the network node is operable to:
receive, from a requesting entity comprising an Application Function (AF), a monitoring request to be notified of an API capability change related to an identified wireless device associated with a service API, the monitoring request identifying a subset of one or more APIs in which the AF is interested to have monitored;
subscribe to receive notifications of a core network type change for the identified wireless device;
receive a notification that the identified wireless device has changed from a first type of core network to a second type of core network;
determine an API capability change from the first type of core network to the second type of core network for the identified subset of one or more APIs in which the AF is interested and filtering out all but the APIs in which the AF is interested; and
report, to the requesting entity, the API capability change for the identified subset of one or more APIs in which the AF is interested and not reporting the API capability change for other APIs not in the identified subset.

7. The network node of claim 6 wherein subscribing to receive notifications of a core network type change for the identified wireless device comprises sending a subscribe request to a node comprising a Home Subscriber Server (HSS), a Unified Data Management function (UDM), or a combined HSS+UDM.

8. The network node of claim 6 subscribing to receive notifications of a core network type change for the identified wireless device comprises sending a Nudm_EventExposure_Subscribe Request.

9. The network node of claim 6 wherein receiving a notification that the identified wireless device has changed from a first type of core network to a second type of core network comprises receiving a Nudm_EventExposure_Notify Response.

10. The network node of claim 6 wherein reporting the API capability change comprises sending a monitoring indication request.

* * * * *